(12) United States Patent
Kurasawa et al.

(10) Patent No.: US 10,585,523 B2
(45) Date of Patent: Mar. 10, 2020

(54) DETECTION APPARATUS AND DISPLAY APPARATUS WITH TOUCH DETECTION FUNCTION

(71) Applicant: Japan Display Inc., Tokyo (JP)

(72) Inventors: Hayato Kurasawa, Tokyo (JP); Yasuyuki Teranishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/999,440

(22) Filed: Aug. 20, 2018

(65) Prior Publication Data

US 2019/0018533 A1 Jan. 17, 2019

Related U.S. Application Data

(63) Continuation of application No. 15/463,065, filed on Mar. 20, 2017, now Pat. No. 10,082,898.

(30) Foreign Application Priority Data

Mar. 25, 2016 (JP) ................................ 2016-062638

(51) Int. Cl.
*G06F 3/041* (2006.01)
*G06F 3/044* (2006.01)

(52) U.S. Cl.
CPC ............ *G06F 3/0414* (2013.01); *G06F 3/044* (2013.01); *G06F 3/0412* (2013.01); *G06F 3/0416* (2013.01); *G06F 3/0418* (2013.01); *G06F 2203/04104* (2013.01);

(Continued)

(58) Field of Classification Search
CPC ...... G06F 3/0414; G06F 3/0416; G06F 3/044; G06F 3/0412; G06F 3/0418; G06F 2203/04107; G06F 2203/04104; G06F 2203/04112; G06F 2203/04108
See application file for complete search history.

(56) References Cited

U.S. PATENT DOCUMENTS

2008/0246496 A1\* 10/2008 Hristov .................. G06F 3/044
324/686
2013/0127752 A1\* 5/2013 Takeuchi ............ G02F 1/13338
345/173

(Continued)

FOREIGN PATENT DOCUMENTS

JP 2010-277152 A 12/2010

*Primary Examiner* — Premal R Patel
(74) *Attorney, Agent, or Firm* — K&L Gates LLP

(57) ABSTRACT

According to an aspect, a detection apparatus includes a touch detection surface having two dimensions, a touch detection unit and a force detection unit. The touch detection unit includes: first electrodes extending along a first direction; and a first signal output unit configured to output a first signal indicating a position of the touch operation in a second direction. Each first electrode includes divided electrodes provided in the first direction. First detection regions each provided by bundling the divided electrodes arranged in the second direction are set. The force detection unit includes a base electrode configured such that distances between the base electrode and the respective divided electrodes change when the first electrodes bend according to the applied force applied. The force signal is a signal based on electrostatic capacitances obtained by individual detection.

9 Claims, 28 Drawing Sheets

(52) U.S. Cl.
CPC ............. *G06F 2203/04107* (2013.01); *G06F 2203/04108* (2013.01); *G06F 2203/04112* (2013.01)

(56) References Cited

U.S. PATENT DOCUMENTS

| | | | |
|---|---|---|---|
| 2014/0267137 A1* | 9/2014 | Solven ................. | G06F 3/0416 345/174 |
| 2014/0285465 A1* | 9/2014 | Hayashi ................. | G06F 3/044 345/174 |
| 2015/0002466 A1 | 1/2015 | Takeuchi et al. | |
| 2015/0268783 A1* | 9/2015 | Yoon ..................... | G06F 3/0414 345/173 |
| 2016/0196001 A1* | 7/2016 | Ku ....................... | G06F 3/0418 345/174 |

\* cited by examiner

DETECTION APPARATUS AND DISPLAY APPARATUS WITH TOUCH DETECTION FUNCTION

CROSS-REFERENCE TO RELATED APPLICATIONS

The present application is a continuation of U.S. application Ser. No. 15/463,065, filed on Mar. 20, 2017, which claims priority from Japanese Application No. 2016-062638, filed on Mar. 25, 2016, the contents of which are incorporated by reference herein in its entirety.

BACKGROUND

1. Technical Field

The present invention relates to a detection apparatus and a display apparatus with a touch detection function.

2. Description of the Related Art

For example, Japanese Patent Application Laid-open Publication No. 2010-277152 is known to disclose a touch detection device that includes a plurality of drive electrodes provided along one direction and subjected to a voltage, and also includes touch detection electrodes provided in a skewed positional relation with the drive electrodes to form electrostatic capacitances. The touch detection device detects the position of a touch operation based on the electrostatic capacitances.

There is a demand for detection of force applied to a touch detection surface associated with the touch operation, in addition to the position of the touch operation. However, separately providing both a configuration for the position detection and a configuration for the force detection related to the touch operation leads to increase in size and cost of a device having both configurations. Thus, there is a demand for sharing components between both configurations. Specifically, the drive electrodes in the configuration of the above-described touch detection device are considered to be used as electrodes for the force detection. However, when the drive electrodes provided along a first direction are used, the electrodes have resolution only in a second direction orthogonal to the first direction. This causes a problem in that no information is obtained on the force detection in the first direction. Thus, no component can be shared between the configuration for the position detection and the configuration for the force detection related to the touch operation.

For the foregoing reasons, there is a need for a detection apparatus and a display apparatus with a touch detection function in which components can be shared between the configuration for the position detection and the configuration for the force detection related to the touch operation.

SUMMARY

According to an aspect, a detection apparatus includes: a touch detection surface serving as a detection region having two dimensions; a touch detection unit configured to output a touch detection signal indicating a position where a touch operation has been performed with the touch detection surface; and a force detection unit configured to output a force signal corresponding to force applied to the touch detection surface along with the touch operation. The touch detection t unit includes: a plurality of first electrodes extending along a first direction of two directions in the two dimensions; and a first signal output unit that is coupled to the first electrodes and configured to output a first signal indicating a position in a second direction orthogonal to the first direction where the touch operation has been performed, the first signal being represented by self-capacitances of the first electrodes. Each of the first electrodes includes a plurality of divided electrodes provided in the first direction. A plurality of first detection regions each provided by bundling the divided electrodes arranged in the second direction are set. The force detection unit includes a base electrode opposed to the divided electrodes with a predetermined gap interposed therebetween, the base electrode being configured such that distances between the base electrode and the respective divided electrodes change when the first electrodes bend toward the predetermined gap according to the applied force. The force signal is a signal based on electrostatic capacitances obtained by individual detection, and the individual detection is such that detection of each of the electrostatic capacitances between the base electrode and the divided electrodes of the first detection regions is individually performed.

According to another aspect, a display apparatus with a touch detection function includes the detection apparatus and a display device configured to display an image on the touch detection surface.

DETAILED DESCRIPTION

Figure 1:
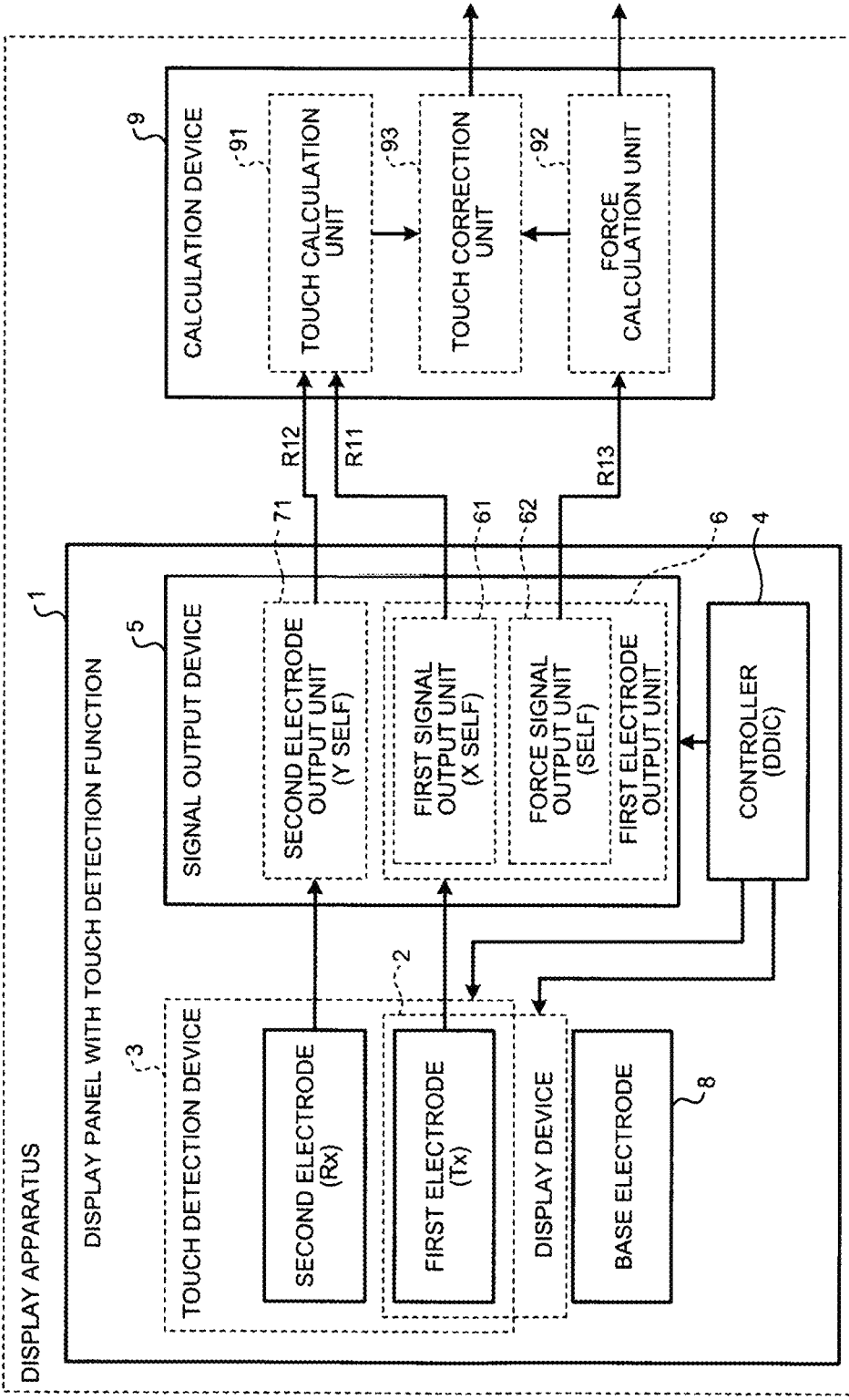
FIG. 1 is a block diagram illustrating a main configuration example of a display apparatus according to a first embodiment.

Hereinafter, embodiments of the present invention will be described with reference to the drawings. The disclosure is merely an example, and the present invention naturally encompasses appropriate modifications maintaining the gist of the invention that is easily conceivable by those skilled in the art. To further clarify the description, a width, a thickness, a shape, and the like of each component may be schematically illustrated in the drawings as compared with an actual aspect. However, this is merely an example, and interpretation of the invention is not limited thereto. The same element as that illustrated in a drawing that has already been discussed is denoted by the same reference sign through the description and the drawings, and detailed description thereof will not be repeated in some cases where appropriate.

In this disclosure, when an element is described as being "on" another element, the element can be directly on the other element, or there can be one or more elements between the element and the other element.

First Embodiment

FIG. 1 is a block diagram illustrating a main configuration example of a display apparatus 100 according to a first embodiment. The display apparatus 100 includes, for example, a display panel with a touch detection function 1 and a calculation device 9. The display panel with a touch detection function 1 is what is called an in-cell display apparatus that is provided with a configuration for display output and a configuration for detecting a position and force of a touch operation. The display panel with a touch detection function 1 includes, for example, a display device 2, a touch detection device 3, a display driver integrated circuit (DDIC) 4 serving as a controller, a signal output device 5, and a base electrode 8. The calculation device 9 is a circuit that performs calculation related to the detection of the position and the force of the touch operation based on various signals output from the display panel with a touch detection function 1. The notation of "SELF" in FIG. 1 and other figures represents a configuration related to a self-capacitance method, which will be described later.

Figure 2:
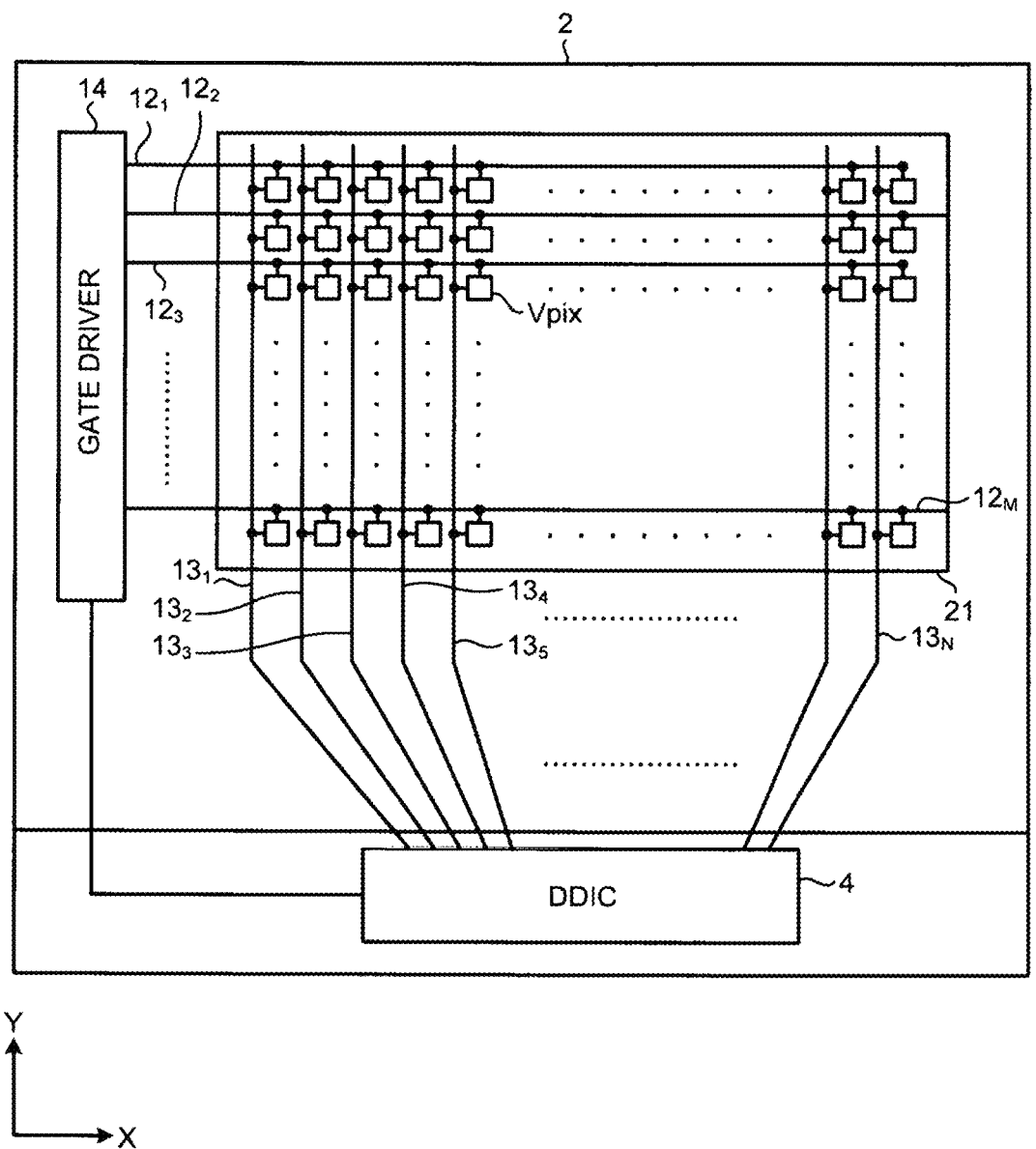
FIG. 2 is a block diagram illustrating a main configuration example of a display device.
Figure 3:
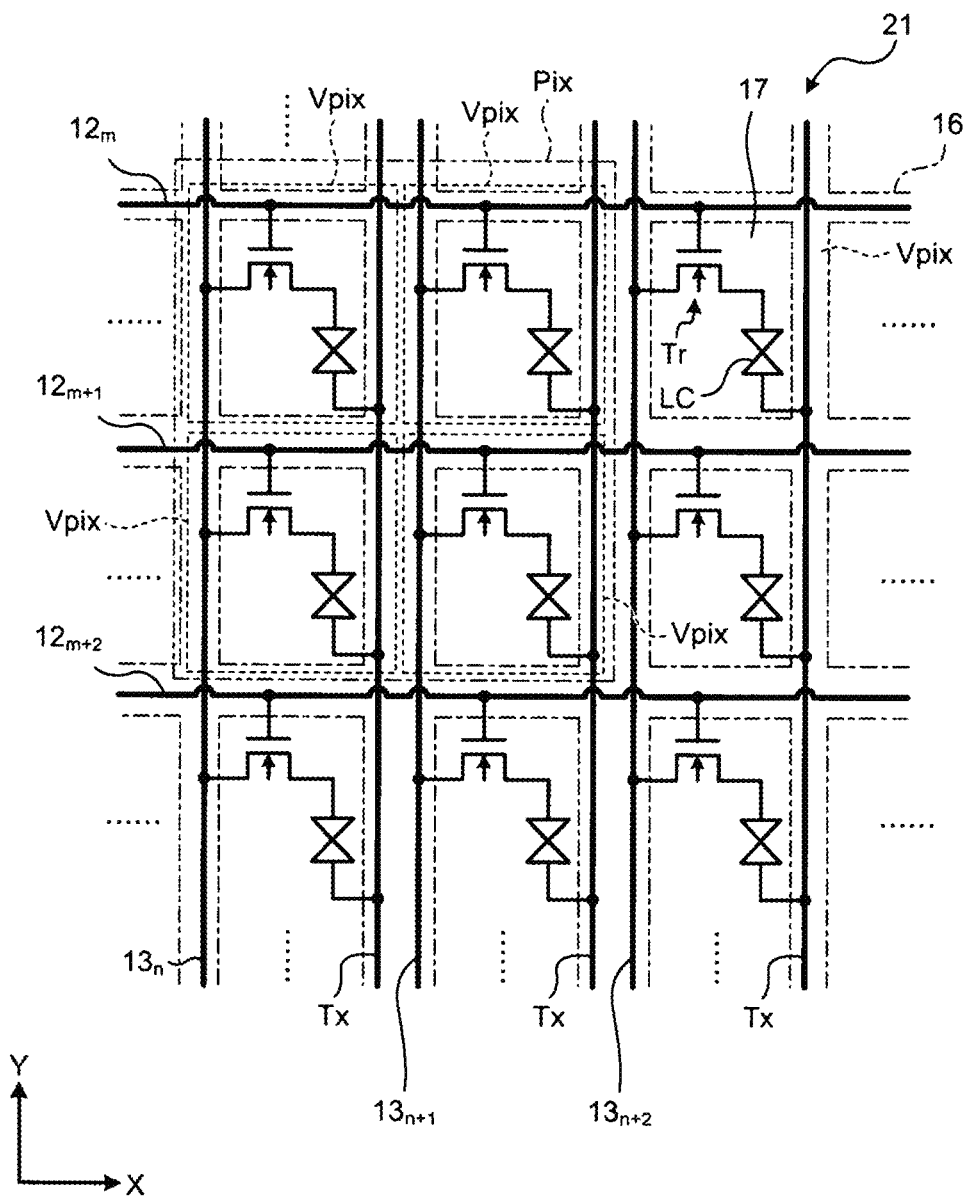
FIG. 3 is a circuit diagram schematically illustrating a configuration example of pixels.
Figure 4:
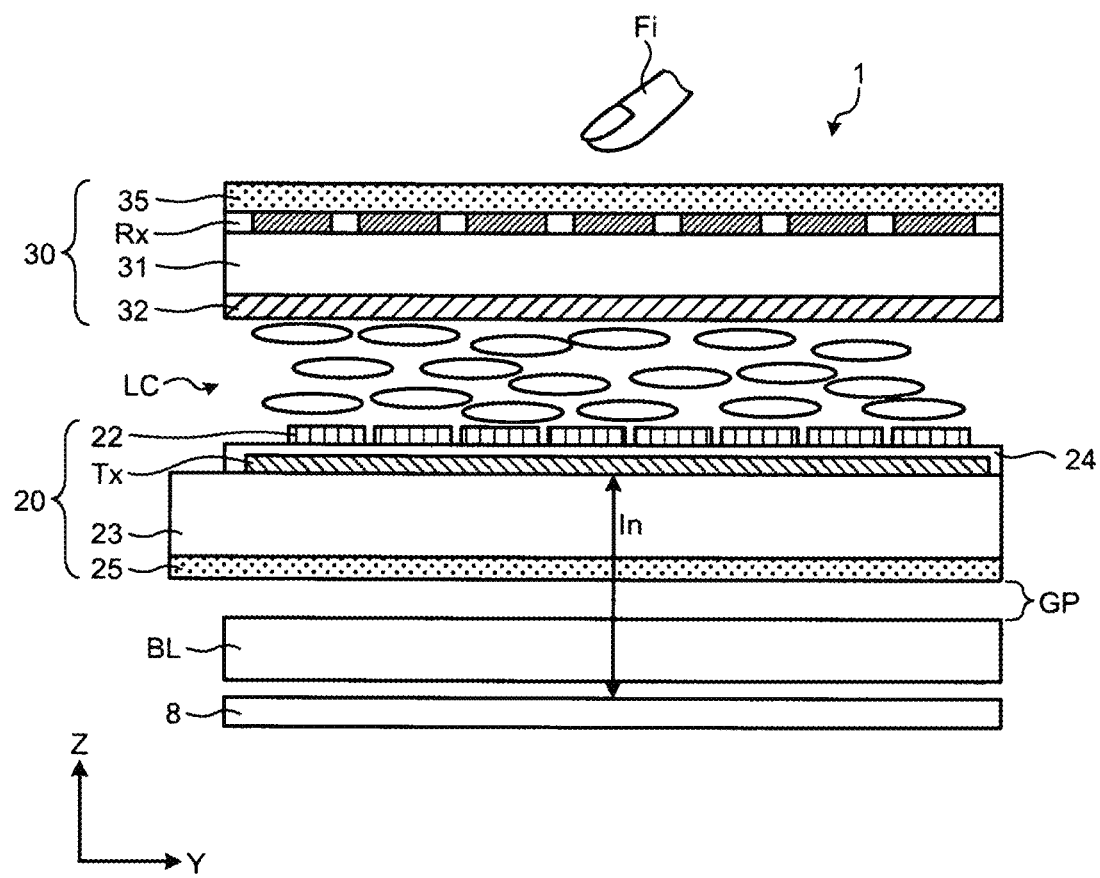
FIG. 4 is a sectional view illustrating a schematic sectional structure of a display panel with a touch detection function.

A description will first be given of the display device 2 configured for display output. FIG. 2 is a block diagram illustrating a main configuration example of the display device 2. FIG. 3 is a circuit diagram schematically illustrating a configuration example of pixels Pix. FIG. 4 is a sectional view illustrating a schematic sectional structure of the display panel with a touch detection function 1.

The display device 2 includes a first substrate 20 provided with pixel electrodes 22 and a second substrate 30 facing the first substrate 20 with a liquid crystal layer LC interposed therebetween. A first surface side (upper side in FIG. 2) of the first substrate 20 facing the liquid crystal layer LC serves as a display surface side, and a second surface side opposite to the first surface side serves as a back surface side. The first substrate 20 has a configuration obtained, for example, by stacking first electrodes Tx, an insulating layer 24 insulating the pixel electrodes 22 from the first electrodes Tx, and the pixel electrodes 22 on the display surface side of a glass substrate 23 serving as a circuit substrate. The second substrate 30 has a configuration in which second electrodes Rx are provided on the display surface side of a glass substrate 31 serving as a circuit substrate, and in which a color filter 32 is provided on the back surface side of the glass substrate 31, for example. In the first embodiment, polarizing plates 25 and 35 are provided on the back surface side of the first substrate 20 and on the display surface side of the second substrate 30. The liquid crystal layer LC is enclosed in a gap formed by a spacer (not illustrated) provided in a space between the first substrate 20 and the second substrate 30. The glass substrates 23 and 31 are not limited to being made of glass, but may be made using another material, such as a transparent resin, that transmits light and allows formation of a circuit thereon.

The display device 2 includes a display area 21 in which the pixels Pix are arranged in a matrix. Specifically, the display area 21 of the display device 2 has a matrix structure in which sub-pixels Vpix are arranged in M rows×N columns. In the first embodiment, the row direction of the sub-pixels Vpix is along a predetermined direction (X-direction), and the column direction of the sub-pixels Vpix is along a direction (Y-direction) orthogonal to the predetermined direction. The X- and the Y-directions are, for example, along a panel of the display panel with a touch detection function 1 in the state in which the force is not applied by the touch operation. A direction orthogonal to the X- and the Y-directions, that is, the stacking direction of the first substrate 20 and the second substrate 30 may be mentioned as the Z-direction.

The display device 2 includes scanning lines $12_1$, $12_2$, $12_3$, ..., and $12_M$ provided row by row and signal lines $13_1$, $13_2$, $13_3$, ..., and $13_N$ provided column by column with respect to the array of M rows×N columns of the sub-pixels Vpix. Hereinafter, the scanning lines $12_1$, $12_2$, $12_3$, ..., and $12_M$ may be expressed as scanning lines 12 as a representative expression, and the signal lines $13_1$, $13_2$, $13_3$, ..., and $13_N$ may be expressed as signal lines 13 as a representative expression. Any three of the scanning lines $12_1$, $12_2$, $12_3$, ..., and $12_M$ may be expressed as scanning lines $12_m$, $12_{m+1}$, and $12_{m+2}$ (where m is a natural number satisfying m≤M−2). Any three of the signal lines $13_1$, $13_2$, $13_3$, ..., and $13_N$ may be expressed as signal lines $13_n$, $13_{n+1}$, and $13_{n+2}$ (where n is a natural number satisfying n≤N−2).

The DDIC 4 is a circuit mounted on the glass substrate 23 of the first substrate 20 by, for example, Chip-on-Glass technology (COG). The DDIC 4 is coupled to, for example, the signal output device 5 and the calculation device 9, for example, through a wiring board, such as a flexible printed circuit (FPC) board. The DDIC 4 operates the display device 2 according to various signals supplied from external equipment serving as an input source of an image (not illustrated). The external equipment outputs, for example, a master clock signal, a horizontal synchronizing signal, a vertical synchronizing signal, and a display image signal to the DDIC 4. The DDIC 4 operates a gate driver 14 based on these signals. The DDIC 4 serves as a source driver.

The gate driver 14 latches digital data on a per horizontal period basis according to the horizontal synchronizing signal in synchronization with the vertical synchronizing signal and the horizontal synchronizing signal. The gate driver 14 sequentially outputs the latched digital data for one line as a vertical scanning pulse to each of the scanning lines 12 in the display area 21 so as to sequentially select the sub-pixels Vpix on a row-by-row basis. The source driver is supplied with, for example, the image signal from the external equipment. The source driver writes video signals for the respective sub-pixels Vpix according to the image signals through the signal lines 13 to the corresponding sub-pixels Vpix in the row selected through the vertical scanning by the gate driver 14. Although FIG. 2 and other figures illustrate the single gate driver 14 on one end side of the scanning lines 12, the configuration of the gate driver 14 is not limited to this configuration, but can be modified as appropriate. The gate driver 14 may include, for example, gate drivers 14a and 14b on both sides of the scanning lines 12 (refer to FIG. 23), which will be described later.

The sub-pixel Vpix includes a thin-film transistor (TFT) element Tr. The TFT element Tr includes a thin-film transistor, specifically, an n-channel metal oxide semiconductor (MOS) TFT, for example. The TFT element Tr is coupled at one of the source and the drain thereof to the signal line 13, coupled at the gate thereof to the scanning line 12, and coupled at the other of the source and the drain thereof to the pixel electrode 22 so as to electrically affect one end of a liquid crystal element included in the liquid crystal layer LC. The orientation of the liquid crystal element is changed by an electric field generated between the other of the source and the drain of the TFT element Tr (pixel electrode 22) and the first electrode Tx serving as a common electrode.

In the display device 2, the gate driver 14 drives the scanning lines 12 so as to sequentially scan the scanning lines 12, and thus sequentially selects one horizontal line. In the liquid crystal display apparatus, the source driver supplies pixel signals to the respective sub-pixels Vpix belonging to one horizontal line through the signal lines 13. The liquid crystal element is oriented according to the electric field that is generated between the pixel electrode 22 and the first electrode Tx according to the video signal. As a result, the display is performed one horizontal line at a time.

The color filter 32 includes a grid-shaped black matrix (BM) 16 and openings 17. The BM 16 is formed so as to surround the outer circumferences of the respective sub-pixels Vpix, as illustrated in FIG. 3. The BM 16 is formed of a material having a high light absorption factor. The display area 21 is disposed in an area where the scanning lines 12 and the signal lines 13 overlap the BM 16 of the color filter 32 when viewed from the Z-direction. That is, the scanning lines 12 and the signal lines 13 are hidden behind the BM 16 when viewed from the display surface side. The openings 17 are formed by the grid shape of the BM 16. The arrangement of the openings 17 corresponds to the arrangement of the sub-pixels Vpix. The openings 17 include color regions corresponding to sub-pixels for outputting four colors, for example. Specifically, the openings 17 include color regions colored, for example, in three colors of red (R), green (G), and blue (B) as an example of a set of a first color, a second color, and a third color, and color regions of a fourth color (such as white (W)). In the openings 17 of the color filter 32, the color regions colored, for example, in three colors of red (R), green (G), and blue (B) are periodically arranged. If the fourth color is white (W), the coloring by the color filter 32 is not applied to the openings 17 for white (W). If the fourth color is another color, the color employed as the fourth color is produced by the color filter 32. In the first embodiment, one set of sub-pixels Vpix corresponding to four colors including R, G, B, and the fourth color (such as W) corresponds to one pixel Pix as illustrated in FIG. 3. The color filter 32 may have a combination of other colors as long as being colored in different colors from each other. If the fourth color is white (W), a light-transmitting resin may be used in the color filter 32 to provide the white color.

A backlight BL is provided on the back surface side of the polarizing plate 25 provided on the first substrate 20. The backlight BL includes, for example, a light source such as light emitting diodes (LEDs), a light guide plate for guiding light from the light source toward the display surface side of the display area 21, and a reflecting plate. The backlight BL operates under control of the DDIC 4, and illuminates the display area 21.

The following describes the touch detection device 3 for the detection of the position and the force of the touch operation. The touch detection device 3 includes the above-described first electrodes Tx and the second electrodes Rx. In the first embodiment, the first electrodes Tx and the second electrodes Rx serve as a touch detection electrode E1 for performing the touch detection using the self-capacitance method.

Figure 5:
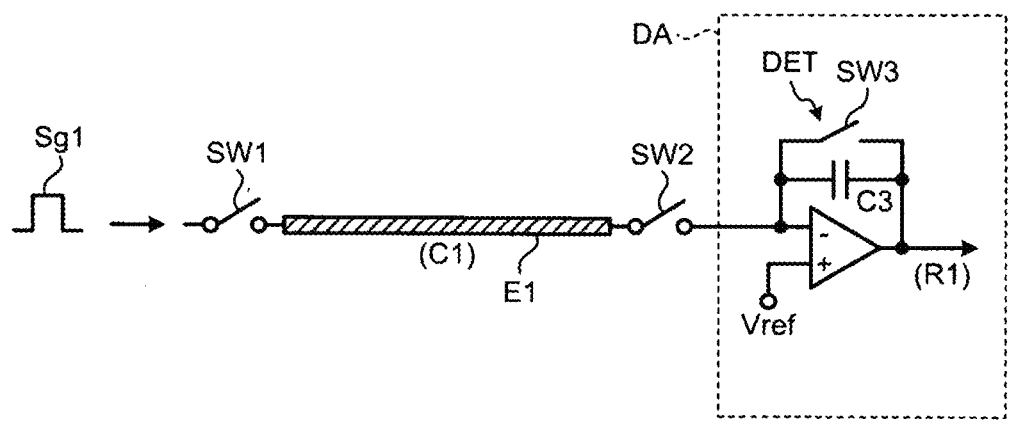
FIG. 5 is an explanatory diagram for explaining a basic principle of self-capacitance touch detection, the diagram illustrating a state in which a finger is neither in contact with nor in proximity to a touch detection electrode.
Figure 6:
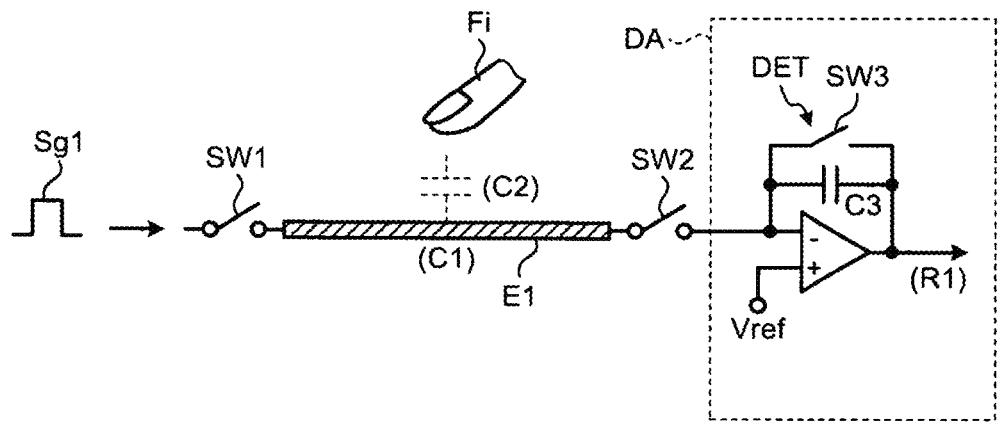
FIG. 6 is an explanatory diagram for explaining the basic principle of the self-capacitance touch detection, the diagram illustrating a state in which the finger is in contact with or in proximity to the touch detection electrode.
Figure 7:
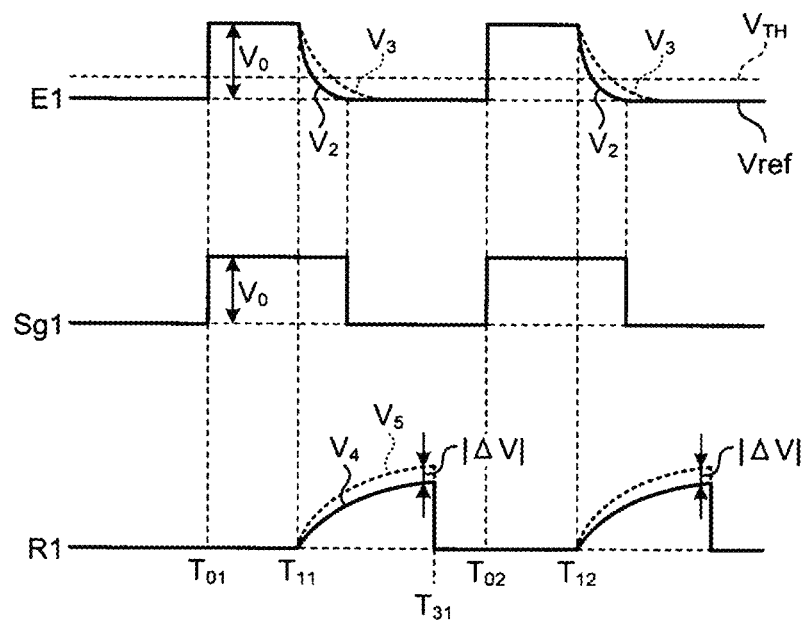
FIG. 7 is a diagram illustrating an example of waveforms of a drive signal and a touch detection signal.

The following describes the basic principle of the self-capacitance touch detection, with reference to FIGS. 5 to 7.

FIG. 5 is an explanatory diagram for explaining the basic principle of the self-capacitance touch detection, the diagram illustrating a state in which a finger Fi is neither in contact with nor in proximity to the touch detection electrode. FIG. 6 is an explanatory diagram for explaining the basic principle of the self-capacitance touch detection, the diagram illustrating a state in which the finger Fi is in contact with or in proximity to the touch detection electrode. FIG. 7 is a diagram illustrating an example of waveforms of a drive signal and a touch detection signal.

As illustrated in FIG. 5, when the finger Fi is neither in contact with nor in proximity to the touch detection electrode E1, an alternating-current (AC) rectangular wave Sg1 having a predetermined frequency (such as roughly several kilohertz to several hundred kilohertz) is applied to the touch detection electrode E1. The touch detection electrode E1 has an electrostatic capacitance C1, and conducts a current corresponding to the electrostatic capacitance C1. A voltage detector DET of a self signal output unit DA converts a variation in current corresponding to the AC rectangular wave Sg1 into a variation in voltage (waveform $V_4$ of a solid line (refer to FIG. 7)).

As illustrated in FIG. 6, when the finger Fi is in contact with or in proximity to the touch detection electrode E1, an electrostatic capacitance C2 between the finger Fi and the touch detection electrode E1 is added to the electrostatic capacitance C1 of the touch detection electrode E1. As a result, applying the AC rectangular wave Sg1 to the touch detection electrode E1 causes a current to flow corresponding to the electrostatic capacitances C1 and C2. As illustrated in FIG. 7, the voltage detector DET converts the variation in the current corresponding to the AC rectangular wave Sg1 into a variation in voltage (waveform $V_5$ of a dotted line). The voltage values of the obtained waveforms $V_4$ and $V_5$ are integrated, and compared with each other, and thereby, whether the finger Fi is in contact with or in proximity to the touch detection electrode E1 can be determined. The determination method is not limited thereto. For example, periods of time until waveforms $V_2$ and $V_3$ in FIG. 7 drop to a predetermined reference voltage may be obtained and compared with each other.

Specifically, as illustrated in FIGS. 5 and 6, the touch detection electrode E1 is configured to be disconnected from other elements by a switch SW1 and a switch SW2. In FIG. 7, a voltage level of the AC rectangular wave Sg1 is increased by a voltage $V_0$, at time $T_{01}$. At this time, the switch SW1 is on, and the switch SW2 is off. Hence, the voltage of the touch detection electrode E1 also increases by the voltage $V_0$. At this time, turning off the switch SW1 brings the touch detection electrode E1 into an electrically floating state (hereinafter, referred to as a floating state). However, the touch detection electrode E1 is maintained at the voltage $V_0$ by the electrostatic capacitance C1 of the touch detection electrode E1 (refer to FIG. 5) or the capacitance (C1+C2; refer to FIG. 6) obtained by adding the electrostatic capacitance C2 generated by the contact or proximity of the finger Fi or the like to the electrostatic capacitance C1 of the touch detection electrode E1. Moreover, a switch SW3 is turned on before time $T_{11}$ and turned off after a lapse of a predetermined time to reset the voltage detector DET. This reset operation sets an output voltage to a voltage substantially equal to a reference voltage Vref.

When, subsequently, the switch SW2 is turned on at time $T_{11}$, the inverting input part of the voltage detector DET is set at the voltage $V_0$ of the touch detection electrode E1, and then, the voltage of the inverting input part of the voltage detector DET drops to the reference voltage Vref according to the time constant of the electrostatic capacitance C1 (or C1+C2) of the touch detection electrode E1 and an electrostatic capacitance C3 in the voltage detector DET. At this time, an electric charge stored in the electrostatic capacitance C1 (or C1+C2) of the touch detection electrode E1 moves to the electrostatic capacitance C3 in the voltage detector DET, and hence, the output (R1) of the voltage detector DET increases. When the finger Fi or the like is not in proximity to the touch detection electrode E1, the output (R1) of the voltage detector DET is represented by the waveform $V_4$ indicated by the solid line, and is given as R1=C1·$V_0$/C3. When a capacitance is added by an influence of the finger Fi or the like, the output (R1) is represented by the waveform $V_5$ indicated by the dotted line, and is given as R1=(C1+C2)·$V_0$/C3. Then, at time $T_{31}$ after the electric charge in the electrostatic capacitance C1 (or C1+C2) of the touch detection electrode E1 has sufficiently moved to the electrostatic capacitance C3, the switch SW2 is turned off, and the switches SW1 and SW3 are turned on so as to lower the potential of the touch detection electrode E1 to a low level potential equal to that of the AC rectangular wave Sg1, and also to reset the voltage detector DET. In this operation, the switch SW1 can be turned on at any time before time $T_{02}$ after the switch SW2 is turned off. The voltage detector DET can be reset at any time before time $T_{12}$ after the switch SW2 is turned off. The above-described operation is repeated at the predetermined frequency (such as roughly several kilohertz to several hundred kilohertz). Whether an external proximate object is present (whether a touch operation is performed) can be determined based on an absolute value |ΔV| of a difference between the waveforms $V_4$ and $V_5$. As illustrated in FIG. 7, the potential of the touch detection electrode E1 is represented by the waveform $V_2$ when the finger Fi or the like is not in proximity to the touch detection electrode E1. The potential of the touch detection electrode E1 is represented by the waveform $V_3$ when the electrostatic capacitance C2 is added by the influence of the finger Fi or the like. Whether the external proximate object is present (whether the touch operation is performed) can be determined by measuring times until voltages of the respective waveforms $V_2$ and $V_3$ drop to a predetermined voltage $V_{TH}$.

Figure 8:
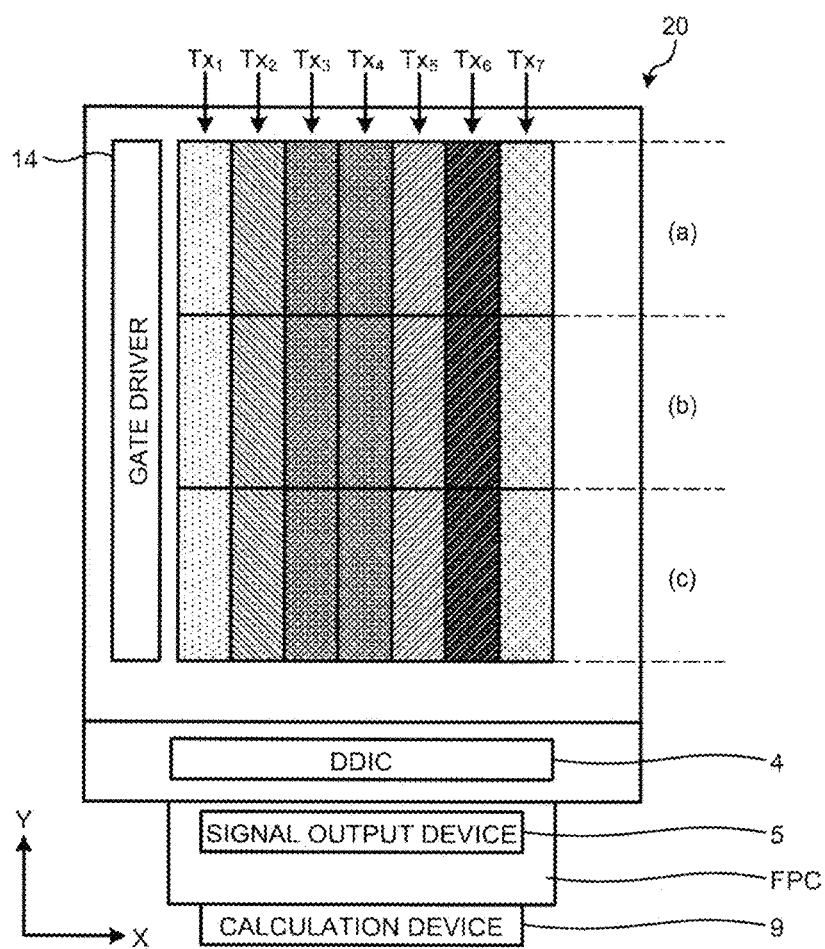
FIG. 8 is a schematic diagram illustrating an arrangement example of first electrodes.
Figure 9:
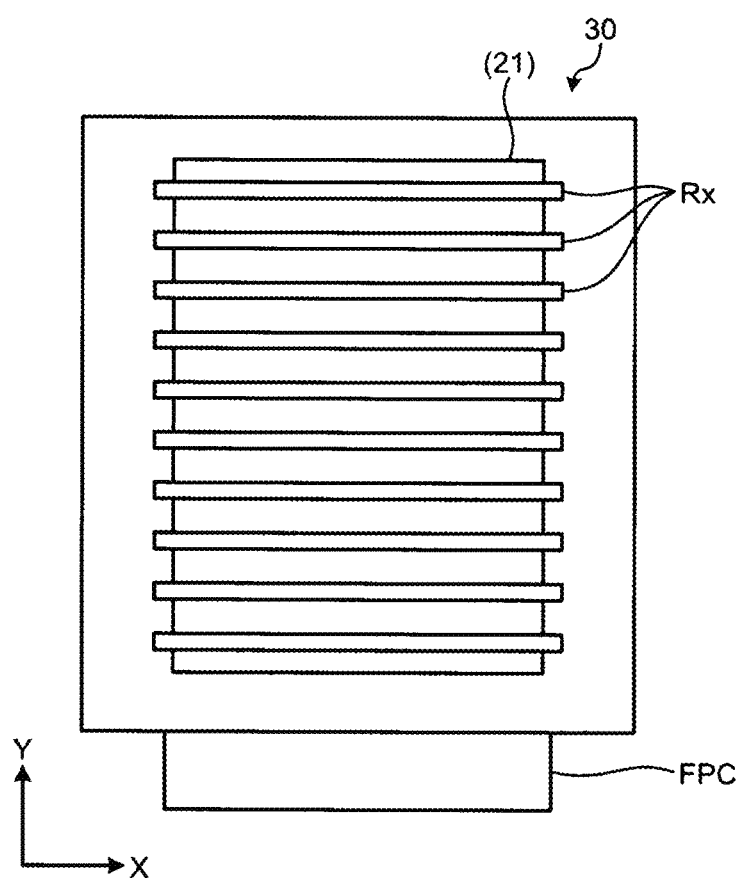
FIG. 9 is a schematic diagram illustrating an arrangement example of second electrodes.

FIG. 8 is a schematic diagram illustrating an arrangement example of the first electrodes Tx. FIG. 9 is a schematic diagram illustrating an arrangement example of the second electrodes Rx. Schematic diagrams, such as FIG. 8, illustrating arrangement examples of the first electrodes Tx exemplify seven such first electrodes Tx (first electrodes $Tx_1, Tx_2, \ldots,$ and $Tx_7$) that extend along the Y-direction and are arranged in the X-direction. Such illustrations, however, do not limit the actual form of the first electrodes Tx. Schematic diagrams, such as FIG. 9, illustrating arrangement examples of the second electrodes Rx exemplify ten such second electrodes Rx that extend along the X-direction and are arranged in the Y-direction. Such illustrations, however, do not limit the actual form of the second electrodes Rx. Specific matters, such as the numbers and arrangement intervals of the first electrodes Tx and the second electrodes Rx, can be modified as appropriate.

The first electrodes Tx and the second electrodes Rx generate an output corresponding to a touch operation performed by a user on the display surface side of the first substrate 20 with the display performed by the display device 2. In the first embodiment, as illustrated in, for example, FIGS. 8 and 9, the first electrodes Tx and the second electrodes Rx provided so as to entirely cover the display area 21 can detect the touch operation performed in a region in the display area 21 on the display surface side of the first substrate 20. Consequently, in the first embodiment, the display surface of the first substrate 20 including at least the region in the display area 21 serves as a two-dimensional detection region. The two-dimensional detection region is, for example, an X-Y region along the display surface of the display area 21, but also includes a region along what is called a curved screen display that is curved in the X-direction, Y-direction, or both directions of the X-Y region.

The first electrode Tx includes a plurality of divided electrodes provided at different locations in the detection region. Specifically, in the first embodiment, the divided electrodes included in the first electrode Tx are arranged in a first direction (Y-direction). More specifically, the first electrode Tx illustrated in FIG. 8 includes three divided electrodes that are provided so as to divide the length in the Y-direction of the first electrode Tx into three parts. In FIG. 8, signs (a), (b), and (c) are assigned to respective three regions corresponding to the three divided electrodes arranged along the Y-direction serving as the extending direction of the first electrode Tx. That is, the regions (a), (b), and (c) can be said to be divided regions of the detection region for the touch detection using the first electrodes Tx. The specific forms of the three divided electrodes are, for example, forms obtained by dividing the first electrode Tx having a length of extension equal to or larger than the width in the Y-direction of the display area 21 into three equal parts. This is, however, merely an example, and the specific forms of the divided electrodes are not limited to the example. The specific forms of the divided electrodes included in the first electrode Tx can be modified as appropriate.

The divided electrodes of the first electrodes Tx are arranged in a second direction (X-direction). Specifically, as illustrated in FIG. 8, the divided electrodes of the seven first electrodes Tx (first electrodes $Tx_1$, $Tx_2$, ..., and $Tx_7$) disposed in the region (a) are arranged in the X-direction. In the same manner, the divided electrodes of the seven first electrodes Tx (first electrodes $Tx_1$, $Tx_2$, ..., and $Tx_7$) disposed in the region (b) are arranged in the X-direction, and the divided electrodes of the seven first electrodes Tx (first electrodes $Tx_1$, $Tx_2$, ..., and $Tx_7$) disposed in the region (c) are arranged in the X-direction.

The first electrodes Tx are used for detection of a position in the second direction (X-direction) among positions where the touch operation has been performed in the detection region. For example, in FIG. 8, the same shading is applied to one or two electrodes that are regarded as one electrode in the detection of the touch operation position using the self-capacitance method. That is, in the example illustrated in FIG. 8, each of the first electrodes $Tx_1$, $Tx_2$, $Tx_5$, $Tx_6$, and $Tx_7$ serves as the independent touch detection electrode E1. In the example illustrated in FIG. 8, a set of the first electrodes $Tx_3$ and $Tx_4$ serves as the single touch detection electrode E1. In this manner, the first electrodes Tx arranged in the X-direction serve as the touch detection electrodes E1 having resolution in the X-direction in the detection of the touch operation position.

The second electrodes Rx are used for detection of a position in the Y-direction among positions where the touch operation has been performed in the detection region. Specifically, each of the second electrodes Rx illustrated in FIG. 9 serves as the independent touch detection electrode E1. In this manner, the second electrodes Rx arranged in the Y-direction each serve as the touch detection electrode E1 having resolution in the Y-direction in the detection of the touch operation position.

The signal output device 5 is a circuit that serves as a first electrode output unit 6 and a second electrode output unit 71. Each of the first electrode output unit 6 and the second electrode output unit 71 includes a plurality of above-mentioned self signal output units DA. When the self signal output units DA included in the first electrode output unit 6 are coupled to the first electrodes Tx, which serve as the touch detection electrode E1 as described with reference to FIG. 8, the self signal output units DA serve as a first signal output unit 61 that outputs a touch detection signal R11. When the self signal output units DA included in the second electrode output unit 71 are coupled to the second electrodes Rx, which serve as the touch detection electrode E1 as described with reference to FIG. 9, the self signal output units DA output a touch detection signal R12. The touch detection signals R11 and R12 are each, for example, a touch detection signal R1 described above, and are used for calculation of the touch detection position by a touch calculation unit 91 of the calculation device 9. In this manner, the display panel with a touch detection function 1 serves as a touch detection unit that outputs the touch detection signals indicating the position where the touch operation has been performed with a touch detection surface serving as the two-dimensional detection region. When the signal output device 5 is coupled to the first electrodes Tx, the signal output device 5 serves as a first signal output unit 61 and outputs the first signal R11 indicating the position in the second direction (X-direction) where the touch operation has been performed, the position in the second direction being indicated by the self-capacitances of the first electrodes Tx. When the signal output device 5 is coupled to the second electrodes Rx, the signal output device 5 serves as a second signal output unit (such as the second electrode output unit 71) and outputs the second signal R12 indicating the position in the first direction (Y-direction) where the touch operation has been performed, the position in the first direction being indicated by the self-capacitances of the second electrodes Rx.

The signal output device 5 may include, for example, an amplifier used for amplifying outputs from the first electrodes Tx and the second electrodes Rx and a filter circuit for removing noise components that can be included in the outputs from the first electrodes Tx and the second electrodes Rx. The signal output device 5 may include an analog-to-digital (A/D) converter for converting various outputs, such as the first signal R11 and the second signal R12, into digital signals. The A/D converter may be included in the calculation device 9, or may be an independent component provided in a signal transmission path between the signal output device 5 and the calculation device 9.

The calculation device 9 is a circuit that includes, for example, an application-specific integrated circuit (ASIC) and/or a field-programmable gate array (FPGA), and performs various calculations related to predefined functions. The calculation device 9 of the first embodiment serves as the touch calculation unit 91, a force calculation unit 92, and a touch correction unit 93. The touch calculation unit 91 calculates the two-dimensional position where the touch operation has been performed, based on touch detection signals (such as the first signal R11 and the second signal R12) output from the signal output device 5. Specifically, the touch calculation unit 91 holds information for handling the arrangement of the first electrodes Tx and the second electrodes Rx as coordinates, and calculates, as coordinates indicating the two-dimensional position, the position where the first electrodes Tx and the second electrodes Rx causing the generation of the output according to the touch operation intersect each other.

The force calculation unit 92 calculates the level of force associated with the touch operation and the two-dimensional position where the force is applied. The touch correction unit 93 corrects the two-dimensional position where the touch operation has been performed, based on the two-dimensional position where the force is applied. The force calculation unit 92 and the touch correction unit 93 will be described later in detail.

Figure 10:
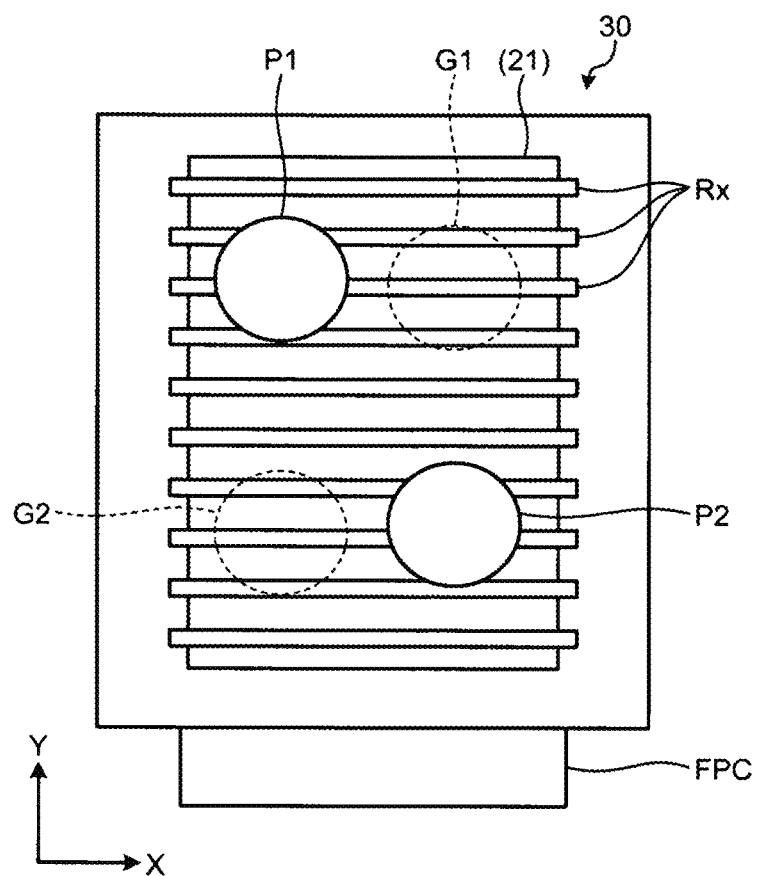
FIG. 10 is a diagram illustrating an example of ghosts that can be generated in touch detection in the first embodiment.

FIG. 10 is a diagram illustrating an example of ghosts that can be generated in the touch detection in the first embodiment. The following describes a case in which an action (multi-touch gesture) of simultaneously applying operations to a plurality of positions, such as touch operation positions P1 and P2 as illustrated in FIG. 10, is performed in the detection region. In this case, the first electrodes Tx corresponding to the touch operation positions P1 and P2 cause generation of outputs according to the touch operation. The second electrodes Rx corresponding to the touch operation positions P1 and P2 also cause generation of outputs according to the touch operation. As a result, touch operation positions obtained by combining the output of the first electrodes Tx with the output of the second electrodes Rx, that is, positions where the first electrodes Tx and the second electrodes Rx causing the generation of the outputs according to the touch operation intersect one another correspond to the touch operation positions P1 and P2 and ghost generation positions G1 and G2. The touch operation is not actually performed in the ghost generation positions G1 and G2. However, if the multi-touch gesture is performed in the detection of the touch operation position employing only the self-capacitance method, it is difficult to identify which of the ghost generation positions G1 and G2 and the touch operation positions P1 and P2 are the positions where the touch operation has been performed. To solve this problem, in the first embodiment, the touch operation positions P1 and P2 are distinguished from the ghost generation positions G1 and G2 based on a detection result of the force associated with the touch operation.

The first electrodes Tx and the base electrode 8 are used for detecting the force associated with the touch operation. As illustrated in FIG. 4, the base electrode 8 is a planar electrode provided, for example, on the back surface side of the backlight BL in a state of having a predetermined potential (for example, in the floating state). The base electrode 8 is provided so as to cover the detection region in the plan view from the display surface side. In the first embodiment, when the touch operation is not performed, the base electrode 8 is substantially parallel to the first electrodes Tx. In this case, a distance In between the first electrodes Tx and the base electrode 8 is equal to a predetermined distance.

The first electrode Tx and the base electrode 8 generate an electrostatic capacitance corresponding to the distance. That is, when the touch operation is not performed, the output of the first electrode Tx includes the influence of the electrostatic capacitance that is generated when the distance In is the predetermined distance. When force is applied, along with the touch operation, from the display surface side to the display panel with a touch detection function 1 by the finger Fi or the like, the second substrate 30 and the first substrate 20 bend toward the back surface side with the pressed touch operation position serving as the center of depression. A predetermined gap GP for allowing the bending of the structure (such as the first substrate 20) provided with the first electrodes Tx toward the base electrode 8 is provided between the first electrodes Tx and the base electrode 8. Thus, the distance In is allowed to vary according to the width in the Z-direction of the predetermined gap GP. The predetermined gap GP is, for example, an air gap provided between the polarizing plate 25 and the backlight BL, as illustrated in FIG. 4. The specific configuration of the predetermined gap GP is, however, not limited to this configuration, but can be modified as appropriate, as long as being provided between a pair of electrodes (in the present embodiment, between the first electrode Tx and the base electrode 8) used for the force detection. For example, an elastically recoverable resin layer may be provided as the predetermined gap GP. In this case, the resin layer is desirably highly light-transmissive, such as transparent. The bending reduces the distance In between the first electrodes Tx and the base electrode 8 to a distance smaller than the predetermined distance with the pressed touch operation position serving as the center of the reduction in distance, and thus changes the electrostatic capacitances formed between the first electrodes Tx and the base electrode 8. Consequently, when the force is applied along with the touch operation, the output of the first electrodes Tx changes to an output including the influence of the electrostatic capacitance that has changed depending on the applied force. The level of the bending corresponds to the level of the force. Eliminating the force eliminates the bending of the structure provided with the first electrodes Tx due to elasticity possessed by the structure. In this manner, the base electrode 8 is provided at a location opposed to the divided electrodes with the predetermined gap GP interposed therebetween to form the electrostatic capacitance in cooperation with the divided electrodes. The base electrode 8 is configured such that, when the first electrodes Tx bend toward the predetermined gap GP according to the force, the distance changes between the base electrode 8 and each of the divided electrodes included in the first electrodes Tx. Through the above-described scheme, in the first embodiment, the force can be detected based on the output of the first electrodes Tx.

More specifically, the change in the electrostatic capacitance according to the change in the distance In between the first electrodes Tx and the base electrode 8 appears as the change in the output when the first electrodes Tx serve as the self-capacitance touch detection electrode E1. As a result, assuming a reference output to be, for example, the output generated when the force is not applied, specifically when a touch operation is performed by proximity to or weak contact with the display surface, the output generated when the force is applied is different from the reference output. The force calculation unit 92 of the calculation device 9, for example, holds the information indicating the reference output, and thereby can calculate the force applied from the display surface to the display panel with a touch detection function 1 along with the touch operation, based on a difference between the reference output and the output of the first electrode Tx serving as the self-capacitance touch detection electrode E1. Assuming, alternatively, the reference output to be, for example, the output generated when the touch operation is not performed, the force calculation unit 92 can detect the force and also the position of the touch operation based on a change in the output relative to the reference output. Through the above-described scheme, the force calculation unit 92 detects the force, and also calculates the two-dimensional position where the touch operation has been performed. As described above, the calculation device 9 includes the force calculation unit 92 that calculates the level of the force and the two-dimensional position where the force is applied, based on the levels of the electrostatic capacitances in a plurality of first detection regions obtained by individual detection.

Figure 11:
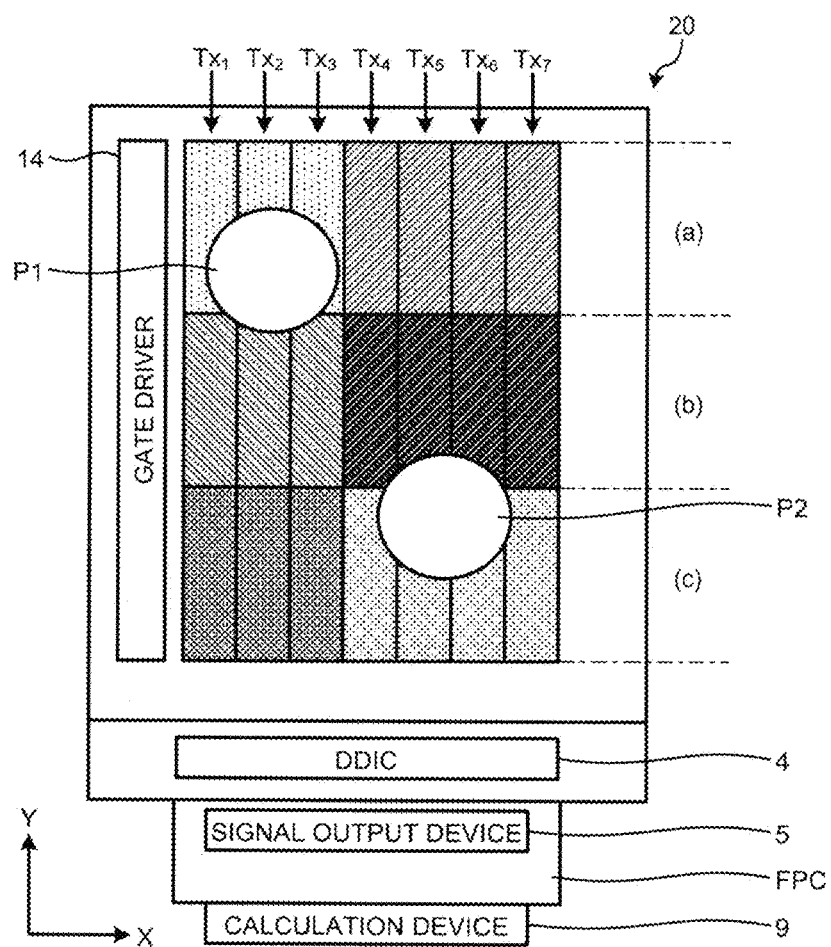
FIG. 11 is a diagram illustrating a plurality of first detection regions that are set for force detection in the first embodiment, the first detection regions being distinguished by different shadings.

FIG. 11 is a diagram illustrating the first detection regions that are set for the force detection in the first embodiment, the first detection regions being distinguished by different shadings. The first detection regions for detecting the force are each provided by bundling a plurality of divided electrodes arranged in the second direction (X-direction), and are set in the display panel with a touch detection function 1. The force detection operation is individually performed for each of the first detection regions. Specifically, as illustrated in FIG. 11, a region in which three divided electrodes of the respective first electrodes $Tx_1$, $Tx_2$, and $Tx_3$ in the region (a) are arranged is set as one of the first detection regions; a region in which three divided electrodes of the respective first electrodes $Tx_1$, $Tx_2$, and $Tx_3$ in the region (b) are arranged is set as another of the first detection regions; a region in which three divided electrodes of the respective first electrodes $Tx_1$, $Tx_2$, and $Tx_3$ in the region (c) are arranged is set as still another of the first detection regions; a region in which four divided electrodes of the respective first electrodes $Tx_4$, $Tx_5$, $Tx_6$, and $Tx_7$ in the region (a) are arranged is set as still another of the first detection regions; a region in which four divided electrodes of the respective first electrodes $Tx_4$, $Tx_5$, $Tx_6$, and $Tx_7$ in the region (b) are arranged is set as still another of the first detection regions; and a region in which four divided electrodes of the respective first electrodes $Tx_4$, $Tx_5$, $Tx_6$, and $Tx_7$ in the region (c) are arranged is set as still another of the first detection regions. In this manner, six first detection regions are set in the first embodiment. The setting of the first detection regions described with reference to FIG. 11 is merely an example, and is not limited thereto. The combination of the divided electrodes arranged in the second direction (X-direction) to be employed in the setting can be modified as appropriate.

When the multi-touch gesture is applied to the touch operation positions P1 and P2 illustrated in FIG. 10, the touch operation and the force are either not detected or only slightly detected in the first detection region in which the four divided electrodes of the respective first electrodes $Tx_4$, $Tx_5$, $Tx_6$, and $Tx_7$ in the region (a) are arranged, as illustrated in FIG. 11. Also, the touch operation and the force are either not detected or only slightly detected in the first detection region in which the three divided electrodes of the respective first electrodes $Tx_1$, $Tx_2$, and $Tx_3$ in the region (c) are arranged. If the touch operation is performed in the ghost generation positions G1 and G2, outputs indicating that at least the touch operation is performed should be generated in these first detection regions, and thus, the touch operation should be detected. Therefore, in the first embodiment, even when the multi-touch gesture is performed, the touch detection can be correctly performed by the detection of the touch operation position based on the self-capacitance method using the first electrodes Tx and the second electrodes Rx, and by the force detection combined with the detection of the touch operation position that is performed using the self-capacitance method in the first detection regions illustrated in FIG. 11.

Based on the touch operation positions calculated by the force calculation unit 92 based on the detection of the touch operation positions associated with the force detection described with reference to FIG. 11, the touch correction unit 93 of the first embodiment can perform processing for distinction between the touch operation positions P1 and P2 and the ghost generation positions G1 and G2 calculated by the touch calculation unit 91. Specifically, the touch correction unit 93, for example, excludes touch operation positions that do not match the touch operation positions calculated by the force calculation unit 92 from the touch operation positions calculated by the touch calculation unit 91, and thereby corrects the touch operation positions calculated by the touch calculation unit 91.

As described above, the self-capacitance method is employed in the position detection and the force detection using the first electrodes Tx in the first embodiment. The self signal output units DA included in the first electrode output unit 6 are also used in the force detection. That is, a force signal output unit (force detection unit) 62 of the first electrode output unit 6 is, for example, the self signal output units DA of the first electrode output unit 6 used to detect the force. In FIG. 1, a force signal R13 represents the output (touch detection signal R1) of each of the self signal output units DA serving as the force signal output unit 62, the output serving as a signal indicating the force. In this manner, the display panel with a touch detection function 1 serves as the force signal output unit 62 that outputs a force signal (such as the force signal R13) corresponding to the force applied to the touch detection surface associated with the touch operation. The force signal R13 is a signal based on the electrostatic capacitances obtained by the individual detection. The individual detection is such that detection of the electrostatic capacitance is individually performed for each of the first detection regions as described with reference to FIG. 11. The detection of the electrostatic capacitance is such that the electrostatic capacitance formed by the divided electrodes included in a single first detection region and the base electrode 8 is detected. In other words, the individual detection is such that detection of each of the electrostatic capacitances between the base electrode and the divided electrodes of the first detection regions is individually performed. The force signal R13 is used, for example, for the calculation of the force by the force calculation unit 92 of the calculation device 9.

The divided electrodes in each of the first detection regions described with reference to FIG. 11 function in a state electrically integrated as one electrode that has a common potential. In this state, the first electrodes Tx can be electrically independent on a per divided electrode basis. Regarding the detection of the touch operation position in the second direction (X-direction) described with reference to FIG. 8, the divided electrodes included in one first electrode Tx are not electrically independent from each other, and function in a state electrically integrated as one electrode (one first electrode Tx) that has a common potential. In this manner, each of the divided electrodes included in the first electrode Tx is provided such that the electrical coupling relation with another divided electrode is switchable between when the touching position in the X-direction is detected and when the force is detected. Hereinafter, when the divided electrodes function as the first electrodes Tx, such as in the case of detecting the touching position in the X-direction, a state in which a plurality of divided electrodes that are continuously arranged in the Y-direction are electrically coupled together will be referred to as a "first state" in some cases. Another state in which a plurality of divided electrodes in one first detection region are electrically coupled together will be referred to as a "second state" in some cases.

Figure 12:
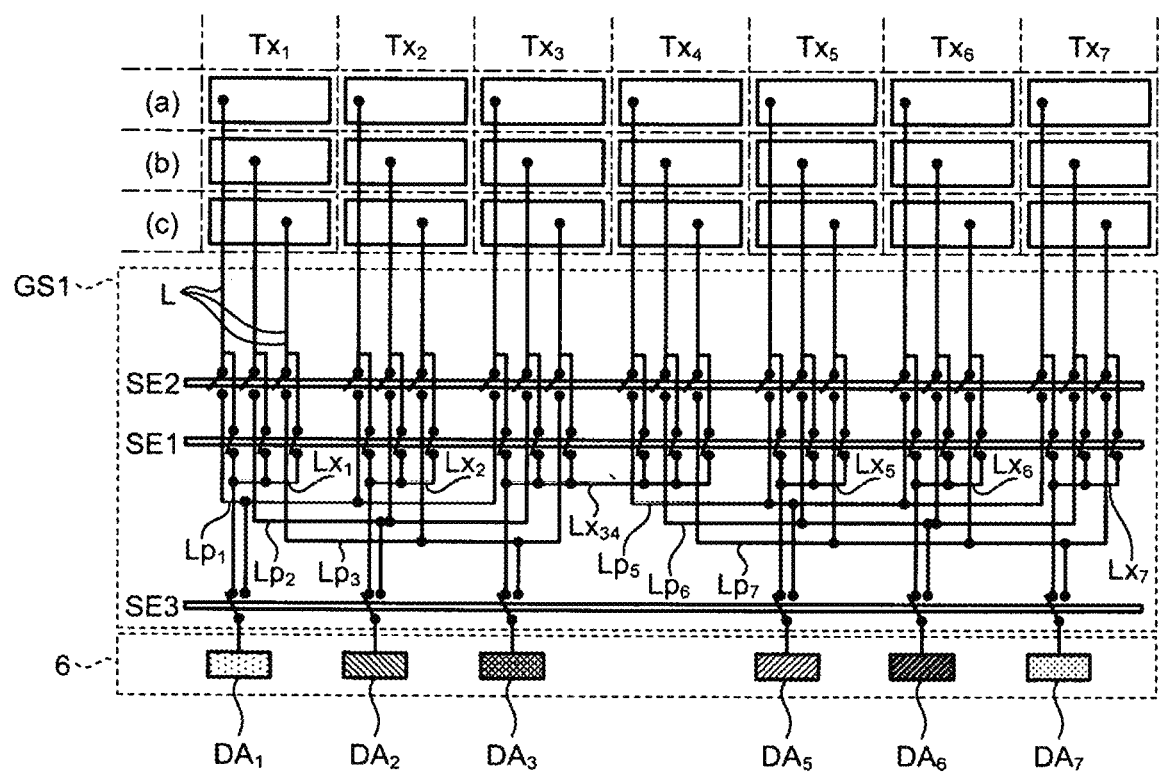
FIG. 12 is a circuit diagram schematically illustrating an exemplary configuration for switching the electrical coupling relation of divided electrodes.

FIG. 12 is a circuit diagram schematically illustrating an exemplary configuration for switching the electrical coupling relation of the divided electrodes. The shadings of the divided electrodes in FIGS. 8 and 11 correspond to the shadings of self signal output units $DA_1$, $DA_2$, $DA_3$, $DA_5$, $DA_6$, and $DA_7$ in FIG. 12. That is, the divided electrodes are coupled to the self signal output units $DA_1$, $DA_2$, $DA_3$, $DA_5$, $DA_6$, and $DA_7$ shaded with the same shadings as those of the respective divided electrodes.

The divided electrodes are coupled to the first electrode output unit 6 through a switching circuit GS1 that can switch between the first state and the second state. The switching circuit GS1 includes, for example, connection lines L; switch units SE1, SE2, and SE3; first state connection lines $Lx_1$, $Lx_2$, $Lx_{34}$, $Lx_5$, $Lx_6$, and $Lx_7$; and second state connection lines $Lp_1$, $Lp_2$, $Lp_3$, $Lp_5$, $Lp_6$, and $Lp_7$.

First end sides of the connection lines L are individually coupled to the divided electrodes. Second end sides of the connection lines L extend toward the first electrode output unit 6 and are each branched into two lines (hereinafter, referred to as a first branch line and a second branch line in some cases). The switch unit SE1 is provided for the first branch lines of the connection lines L. The switch unit SE2 is provided for the second branch lines of the connection lines L. Each of the switch units SE1 and SE2 includes switches for switching between electrical coupling and decoupling of the corresponding branch lines.

Each of the first state connection lines $Lx_1$, $Lx_2$, $Lx_{34}$, $Lx_5$, $Lx_6$, and $Lx_7$ couples together the second ends of the first branch lines provided with the switch unit SE1. Specifically, the first state connection line $Lx_1$ couples together the second ends of the first branch lines of the corresponding connection lines L that are coupled to the three divided electrodes in the respective regions (a), (b), and (c) included in the first electrode $Tx_1$. In the same manner, each of the first state connection lines $Lx_2$, $Lx_5$, $Lx_6$, and $Lx_7$ couples together the second ends of the first branch lines of the corresponding connection lines L that are coupled to the three divided electrodes in the respective regions (a), (b), and (c) included in a corresponding one of the first electrodes $Tx_2$, $Tx_5$, $Tx_6$, and $Tx_7$. The first state connection line $Lx_{34}$ couples together the second ends of the first branch lines of the connection lines L that are coupled to the three divided electrodes in the respective regions (a), (b), and (c) included in the first electrode $Tx_3$, and also the second ends of the first branch lines of the connection lines L that are coupled to the three divided electrodes in the respective regions (a), (b), and (c) included in the first electrode $Tx_4$. That is, the first state connection line $Lx_{34}$ couples together the second ends of the first branch lines of the corresponding connection lines L that are coupled to a total of six divided electrodes.

Each of the second state connection lines $Lp_1$, $Lp_2$, $Lp_3$, $Lp_5$, $Lp_6$, and $Lp_7$ couples together the second ends of the second branch lines provided with the switch unit SE2. Specifically, the second state connection line $Lp_1$ couples together the second ends of the second branch lines of the connection lines L that are coupled to the divided electrodes of the respective first electrodes $Tx_1$, $Tx_2$, and $Tx_3$ in the region (a); the second state connection line $Lp_2$ couples together the second ends of the second branch lines of the connection lines L that are coupled to the divided electrodes of the respective first electrodes $Tx_1$, $Tx_2$, and $Tx_3$ in the region (b); the second state connection line $Lp_3$ couples together the second ends of the second branch lines of the connection lines L that are coupled to the divided electrodes of the respective first electrodes $Tx_1$, $Tx_2$, and $Tx_3$ in the region (c); the second state connection line $Lp_5$ couples together the second ends of the second branch lines of the connection lines L that are coupled to the divided electrodes of the respective first electrodes $Tx_4$, $Tx_5$, $Tx_6$, and $Tx_7$ in the region (a); the second state connection line $Lp_6$ couples together the second ends of the second branch lines of the connection lines L that are coupled to the divided electrodes of the respective first electrodes $Tx_4$, $Tx_5$, $Tx_6$, and $Tx_7$ in the region (b); and the second state connection line $Lp_7$ couples together the second ends of the second branch lines of the connection lines L that are coupled to the divided electrodes of the respective first electrodes $Tx_4$, $Tx_5$, $Tx_6$, and $Tx_7$ in the region (c).

The switch unit SE3 includes respective switches for coupling the self signal output units $DA_1$, $DA_2$, $DA_3$, $DA_5$, $DA_6$, and $DA_7$ included in the first electrode output unit 6 to either the first state connection lines $Lx_1$, $Lx_2$, $Lx_{34}$, $Lx_5$, $Lx_6$, and $Lx_7$ or the second state connection lines $Lp_1$, $Lp_2$, $Lp_3$, $Lp_5$, $Lp_6$, and $Lp_7$. When the switch unit SE3 is coupled to the first state connection lines $Lx_1$, $Lx_2$, $Lx_{34}$, $Lx_5$, $Lx_6$, and $Lx_7$, the switch unit SE1 is placed in the coupled state, and the switch unit SE2 is placed in the decoupled state. When the switch unit SE3 is coupled to the second state connection lines $Lp_1$, $Lp_2$, $Lp_3$, $Lp_5$, $Lp_6$, and $Lp_7$, the switch unit SE1 is placed in the decoupled state, and the switch unit SE2 is placed in the coupled state. In this manner, the divided electrodes establish the electrical coupling relation through the routes coupled to the self signal output units $DA_1$, $DA_2$, $DA_3$, $DA_5$, $DA_6$, and $DA_7$ by the switch unit SE3.

For example, when the switch unit SE1 is in the coupled state, the three divided electrodes in the regions (a), (b), and (c) in each of the first electrodes $Tx_1$, $Tx_2$, $Tx_5$, $Tx_6$, and $Tx_7$ are electrically coupled to one another, and the total of six divided electrodes in the regions (a), (b), and (c) in the first electrodes $Tx_3$ and $Tx_4$ are electrically coupled to one another. That is, when the switch unit SE1 is in the coupled state, the first state (refer to FIG. 8) in the first embodiment is established. When, instead, the switch unit SE2 is in the coupled state, the divided electrodes in each of the first detection regions are electrically coupled to one another, so that the second state (refer to FIG. 11) in the first embodiment is established.

The self signal output units $DA_1$, $DA_2$, $DA_3$, $DA_5$, $DA_6$, and $DA_7$ are indicated with subscript numbers so as to be individually identified as the self signal output units DA included in the first electrode output unit 6, and each serve as the self signal output unit DA. That is, the self signal output units $DA_1$, $DA_2$, $DA_3$, $DA_5$, $DA_6$, and $DA_7$ serve as the first signal output unit 61 when coupled to the first state connection lines $Lx_1$, $Lx_2$, $Lx_{34}$, $Lx_5$, $Lx_6$, and $Lx_7$, and serve as the force signal output unit 62 when coupled to the second state connection lines $Lp_1$, $Lp_2$, $Lp_3$, $Lp_5$, $Lp_6$, and $Lp_7$.

In the first embodiment, the number of the self signal output units DA included in the signal output device 5 is set to match the number (6) of the first detection regions that are set for the force detection. Hence, when the number (such as 7) of the first electrodes Tx used for the X-directional touch position detection is larger than the number (6) of the self signal output units DA, the first state connection line $Lx_{34}$ couples together the second ends of the first branch lines of the connection lines L that are coupled to the three divided electrodes in the respective regions (a), (b), and (c) included in the first electrode $Tx_3$, and also the second ends of the first branch lines of the connection lines L that are coupled to the three divided electrodes in the respective regions (a), (b), and (c) included in the first electrode $Tx_4$; that is, the first state connection line $Lx_{34}$ couples together the second ends of the first branch lines of the connection lines L that are coupled to the total of six divided electrodes. In this manner, the wiring of the switching circuit GS1, such as the first state connection lines Lx, is contrived, and, as a result, even when the number of the first electrodes Tx differs from the number of the first detection regions, the common configuration of the signal output device 5 can be used for the touch position detection and the force detection.

In the first embodiment, the DDIC 4 controls the operations of the components of the touch detection device 3. Specifically, the DDIC 4 operates the signal output device 5 based on, for example, the master clock signal, the horizontal synchronizing signal, and the vertical synchronizing signal so as to output a signal corresponding to the change in the electrostatic capacitance formed by at least either of the first electrodes Tx and the second electrodes Rx alternately with the line-by-line display output by the display device 2.

Figure 13:
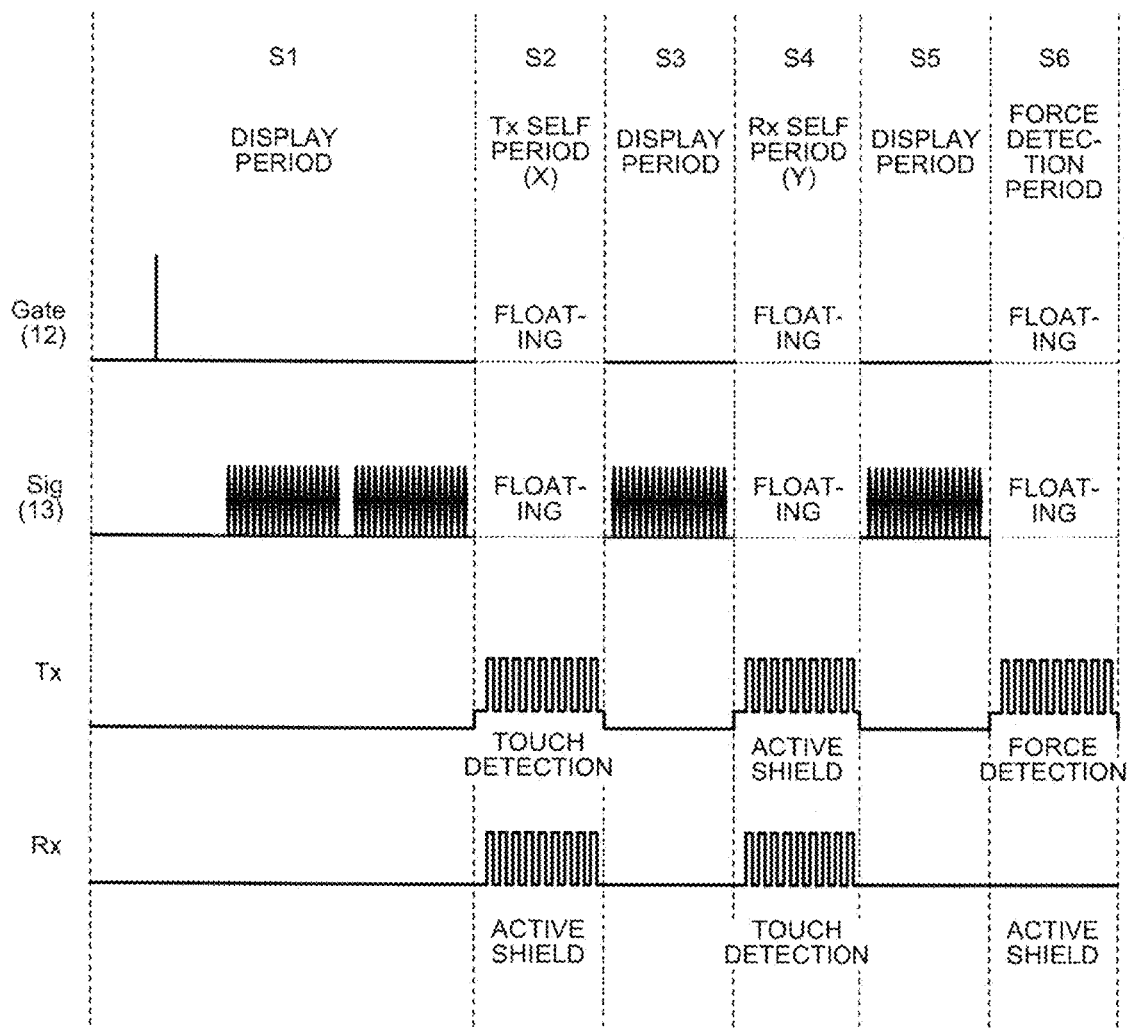
FIG. 13 is a timing diagram illustrating an exemplary relation between signals on scanning lines, signal lines, the first electrodes, and the second electrodes in the first embodiment.

FIG. 13 is a timing diagram illustrating an exemplary relation between signals on the scanning lines 12, the signal lines 13, the first electrodes Tx, and the second electrodes Rx in the first embodiment. "Gate" and "Sig" in timing diagrams of FIG. 13 and other figures represent the signals on the scanning lines 12 and the signal lines 13, respectively. In the first embodiment, as illustrated, for example, in FIG. 13, a display period in which the display output is performed and a detection period in which any one of the X-direction touch position detection, the Y-directional touch position detection, and the force detection is performed are alternately provided. Periods of Steps S1, S3, and S5 each correspond to the display period. Periods of Steps S2, S4, and S6 each correspond to the detection period. For example, in the period of Step S1, the video signal is output, through the signal lines 13, to the sub-pixels Vpix coupled to the scanning line 12 supplied with the vertical scanning pulse. Although the vertical scanning pulse of the scanning line 12 is not illustrated in each of the periods of Steps S3 and S5, signal output is performed in the same manner as those in the period of Step S1.

In the period of Step S2, the X-directional touch position detection is performed using the first electrodes Tx (refer to FIG. 8). Specifically, in the state in which the divided electrodes are coupled to one another through the routes on the switch unit SE1 side, the first electrode output unit 6 serving as the first signal output unit 61 outputs the first signal R11. In the period of Step S4, the Y-directional touch position detection is performed using the second electrodes Rx (refer to FIG. 9). Specifically, the second electrode output unit 71 coupled to the second electrodes Rx outputs the second signal R12. In the period of Step S6, the force detection is performed based on the setting of the first detection regions (refer to FIG. 11). Specifically, in the state in which the divided electrodes are coupled to one another through the routes on the switch unit SE2 side, the first electrode output unit 6 serving as the force signal output unit 62 outputs the force signal R13. During the periods of Steps S2, S4, and S6, the scanning lines 12 and the signal lines 13 are in the floating state. During the periods of Steps S2 and S6, the second electrodes Rx are in an active shield state of, for example, keeping changing in potential by being supplied with an alternating current. During the period of Steps S4, the first electrodes Tx are in the active shield state of, for example, keeping changing in potential by being supplied with an alternating current.

Although FIG. 13 does not illustrate periods of Step S7 and later, the periods of Steps S1 to S6 are actually repeated in the same sequence during the periods of Step S7 and later.

The order of Steps S2, S4, and S6 may be changed. Steps S1, S3, S5, . . . may be performed before or after Steps S2, S4, S6, . . . , respectively.

As described above, according to the first embodiment, the first electrodes Tx each include a plurality of divided electrodes provided at different locations in the detection region; the first detection regions in each of which a plurality of divided electrodes arranged in the X-direction are bundled are set; and a force signal (such as the force signal R13) is obtained based on the electrostatic capacitances obtained by the individual detection. The individual detection being such that detection of the electrostatic capacitance is individually performed for each of the first detection regions, the detection of the electrostatic capacitance being such that the electrostatic capacitance formed by the divided electrodes included in a single first detection region and the base electrode 8 is detected. This enables the detection of the force for each of the first detection regions not dependent on the extending direction of the first electrodes Tx. As a result, components can be shared between the configuration for the position detection and the configuration for the force detection related to the touch operation.

Since the display panel with a touch detection function 1 include the second electrodes Rx along the X-direction and the second signal output unit (such as the second electrode output unit 71) that is coupled to the second electrodes Rx, and that outputs the second signal 12 indicating the position in the first direction where the touch operation has been performed and that is indicated by the self-capacitances of the second electrodes Rx. As a result, the signals indicating the two-dimensional position can be more accurately obtained using the first electrodes Tx and the second electrodes Rx.

Since the two-dimensional position where the touch operation has been performed is corrected based on the two-dimensional position where the force is applied, the generation of the ghosts can be restrained, and the touch detection can be more accurately performed.

The divided electrodes included in the first electrode Tx are arranged in the first direction (Y-direction). This causes the first detection regions to have resolution in the first direction with the simple configuration.

Second Embodiment

The following describes a second embodiment that is an embodiment different from the first embodiment. In the description of the second embodiment, the same configurations as those in the first embodiment will be assigned the same reference signs, and will not be described in some cases.

Figure 14:
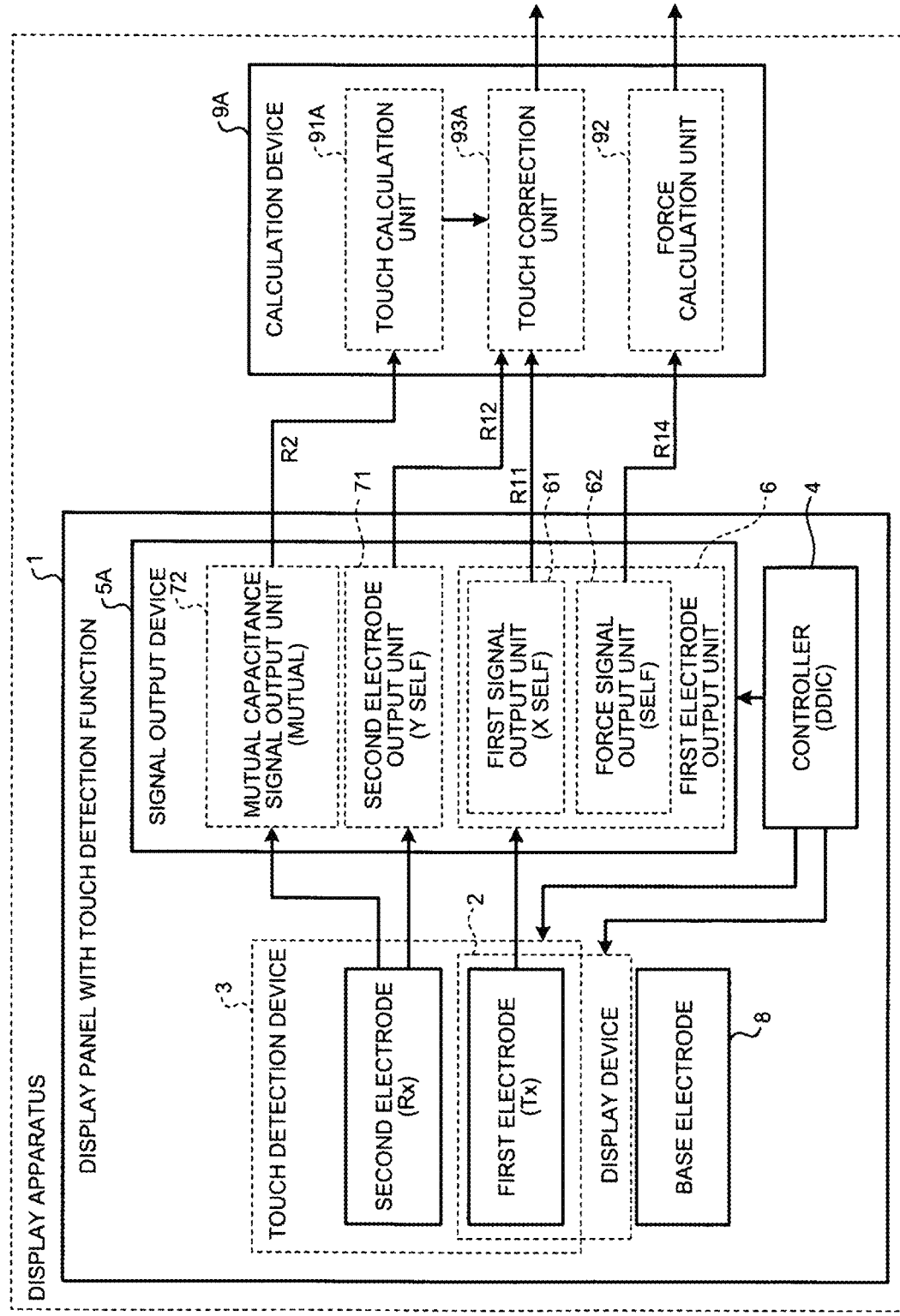
FIG. 14 is a block diagram illustrating a main configuration example of a display apparatus according to a second embodiment.

FIG. 14 is a block diagram illustrating a main configuration example of a display apparatus 100A according to the second embodiment. The display apparatus 100A of the second embodiment includes a signal output device 5A, instead of the signal output device 5 in the display apparatus 100 of the first embodiment. The display apparatus 100A of the second embodiment also includes a calculation device 9A, instead of the calculation device 9 in the display apparatus 100 of the first embodiment. The notation of "MUTUAL" in FIG. 14 and other figures represents a configuration related to a mutual capacitance method (to be described later).

The signal output device 5A is a circuit that serves as a mutual capacitance signal output unit 72, in addition to having the same function as the signal output device 5. The mutual capacitance signal output unit 72 outputs a touch detection signal R2 based on an output from the second electrodes Rx that operate according to the mutual capacitance method.

Figure 15:
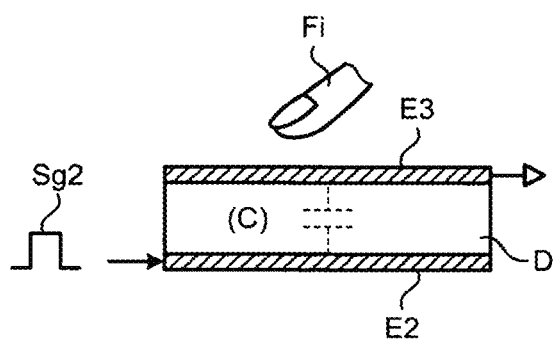
FIG. 15 is an explanatory diagram for explaining a basic principle of mutual capacitance touch detection, the diagram illustrating a state in which the finger is neither in contact with nor in proximity to a touch detection electrode.
Figure 16:
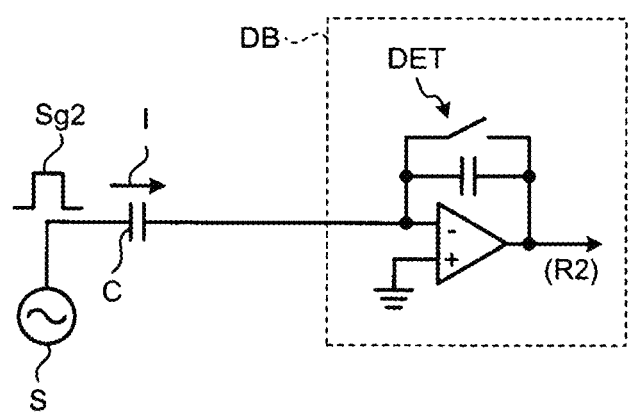
FIG. 16 is an explanatory diagram illustrating an example of an equivalent circuit in the state illustrated in FIG. 15 in which the finger is neither in contact with nor in proximity to the touch detection electrode.
Figure 17:
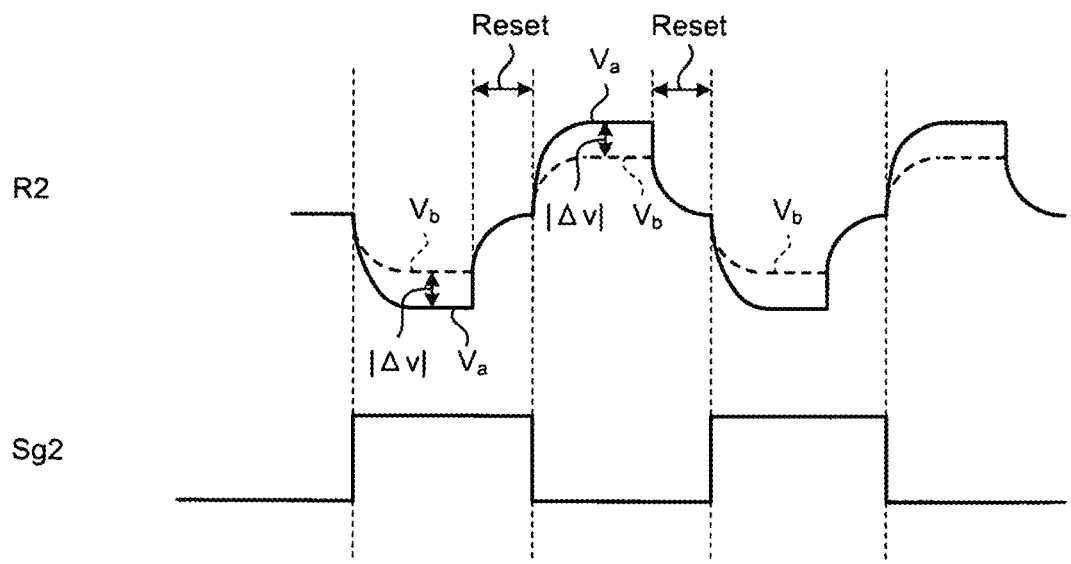
FIG. 17 is a diagram illustrating an example of waveforms of a drive signal and a touch detection signal.

The following describes the basic principle of the mutual capacitance touch detection, with reference to FIGS. 15 to 17. FIG. 15 is an explanatory diagram for explaining the basic principle of the mutual capacitance touch detection, the diagram illustrating a state in which the finger Fi is neither in contact with nor in proximity to a touch detection electrode. FIG. 16 is an explanatory diagram illustrating an example of an equivalent circuit in the state illustrated in FIG. 15 in which the finger Fi is neither in contact with nor in proximity to the touch detection electrode. FIG. 17 is a diagram illustrating an example of waveforms of a drive signal and a touch detection signal. Although the following describes the case where the finger Fi is in contact with or in proximity to the touch detection electrode, the external proximate object is not limited to the finger Fi and may be a device including a conductor, such as a stylus pen.

For example, as illustrated in FIG. 15, a capacitive element C includes a pair of electrodes, that is, a drive electrode E2 and a touch detection electrode E3 that are arranged opposite to each other with a dielectric material D interposed therebetween. As illustrated in FIG. 16, a first end of the capacitive element C is coupled to an alternating-current signal source (drive signal source) S, and a second end thereof is coupled to the voltage detector DET of a mutual signal output unit DB.

Applying an alternating-current (AC) rectangular wave Sg2 having a predetermined frequency (such as roughly several kilohertz to several hundred kilohertz) from the alternating-current signal source S to the drive electrode E2 (the first end of the capacitive element C) causes an output waveform (touch detection signal R2) illustrated in FIG. 17 to be generated through the voltage detector DET coupled to the touch detection electrode E3 side (the second end of the capacitive element C). The AC rectangular wave Sg2 is, for example, a drive signal output from an electrode driver 15 (refer to FIG. 19).

In the state (non-contact state) in which the finger Fi is not in contact with (or in proximity to) the touch detection electrode, an output (current I) corresponding to the capacitance value of the capacitive element C flows with charge and discharge of the capacitive element C, as illustrated in FIGS. 15 and 16. As illustrated in FIG. 17, the voltage detector DET converts the variation in the current I according to the AC rectangular wave Sg2 into a variation in voltage (waveform $V_a$ of a solid line).

In the state (contact state) in which the finger Fi is in contact with (or in proximity to) the touch detection electrode, an electrostatic capacitance formed by the finger Fi is in contact with or in proximity to the touch detection electrode E3. This shields a fringe portion of the electrostatic capacitance between the drive electrode E2 and the touch detection electrode E3, and thus causes the capacitive element C to act as a capacitive element having a smaller capacitance value than that in the non-contact state. The current I flows in a manner varying with the variation of the capacitive element C. As illustrated in FIG. 17, the voltage detector DET converts the variation in the current I according to the AC rectangular wave Sg2 into a variation in voltage (waveform $V_b$ of a dotted line). In this case, the waveform $V_b$ has a smaller amplitude than that of the above-mentioned waveform $V_a$. As a result, an absolute value $|\Delta v|$ of a voltage difference between the waveforms $V_a$ and $V_b$ changes according to an influence of an object, such as the finger Fi, approaching from the outside. To accurately detect the absolute value $|\Delta v|$ of the voltage difference between the waveforms $V_a$ and $V_b$, the voltage detector DET should preferably perform an operation that includes a period Reset during which the charge or discharge of the capacitor is reset by switching in the circuit in accordance with the frequency of the AC rectangular wave Sg2.

Figure 18:
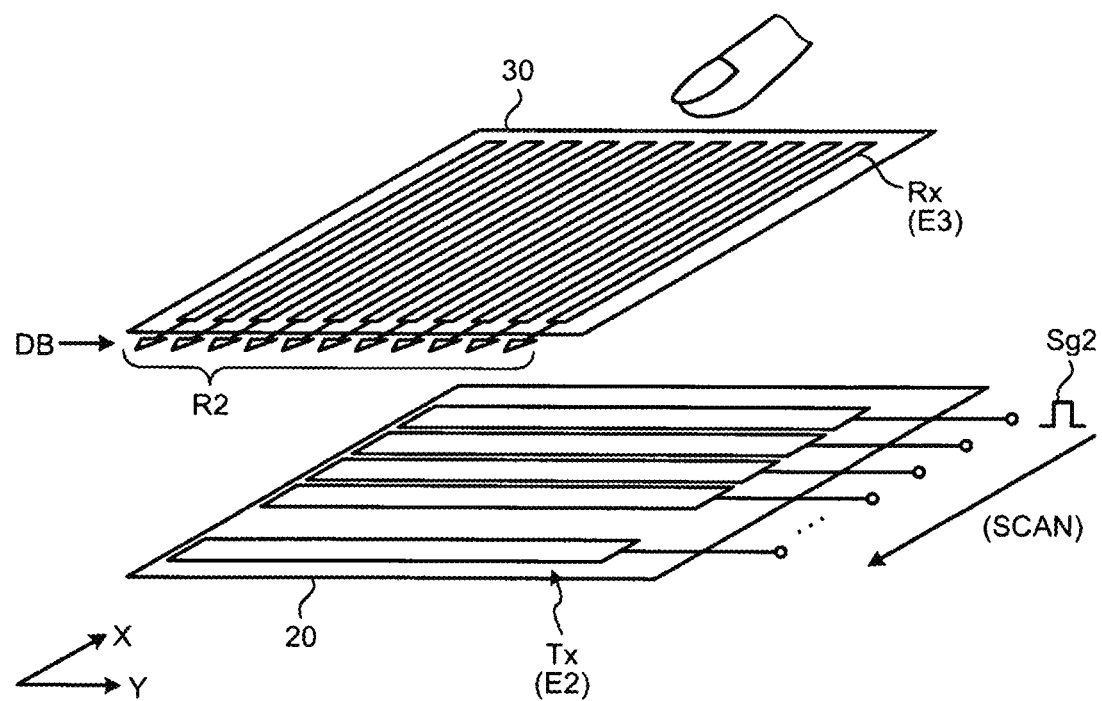
FIG. 18 is a perspective view illustrating an arrangement example of the first electrodes and the second electrodes and an exemplary direction of scanning the first electrodes.

FIG. 18 is a perspective view illustrating an arrangement example of the first electrodes Tx and the second electrodes Rx and an exemplary direction of scanning the first electrodes Tx. In the second embodiment, the first electrodes Tx serve as the electrodes used for display by the display device 2 and as the self-capacitance touch detection electrode E1 for touch detection by the touch detection device 3 in the same manner as in the first embodiment, and in addition, serve as the drive electrode E2 for performing the mutual capacitance touch detection. The second electrodes Rx serve as the self-capacitance touch detection electrode E1 for touch detection by the touch detection device 3 in the same manner as in the first embodiment, and in addition, serve as the touch detection electrode E3 for performing the mutual capacitance touch detection.

The first electrodes Tx extend along the Y-direction and are arranged in the X-direction on the first substrate 20. The second electrodes Rx extend along the X-direction and are arranged in the Y-direction on the second substrate 30. The first electrodes Tx and the second electrodes Rx intersect each other in a skewed positional relation to form electrode patterns, which generate electrostatic capacitances at intersecting portions therebetween. In the touch detection device 3, the mutual capacitance signal output unit 72 including the mutual signal output unit DB outputs the touch detection signal R2 based on the output from the second electrodes Rx that has been produced in response to the application of the AC rectangular wave Sg2 from the electrode driver 15 to the first electrodes Tx.

As illustrated in FIG. 18, the electrode patterns intersecting each other form capacitance touch sensors having a matrix configuration in the detection region. As a result, the detection of the position where the external proximate object is in contact with or in proximity to the display area 21 can be performed by scanning the entire display area 21 on the display surface side serving as the touch detection surface of the touch detection device 3. Specifically, for example, when the touch detection operation is performed using the mutual capacitance method, the electrode driver 15 performs driving so as to line-sequentially scan each of the first electrodes Tx or each drive electrode block obtained by bundling a plurality of such first electrodes Tx in a time-division manner. As a result, the touch detection is performed along the scanning direction indicated by an arrow in FIG. 18. As described above, the display panel with a touch detection function 1 of the second embodiment includes the mutual capacitance signal output unit 72 that is coupled to the second electrodes Rx, and that outputs the mutual capacitance signal indicating the two-dimensional position where the touch operation has been performed, based on the mutual capacitances formed by the first electrodes Tx and the second electrodes Rx according to the voltage applied to the first electrodes Tx.

Figure 19:
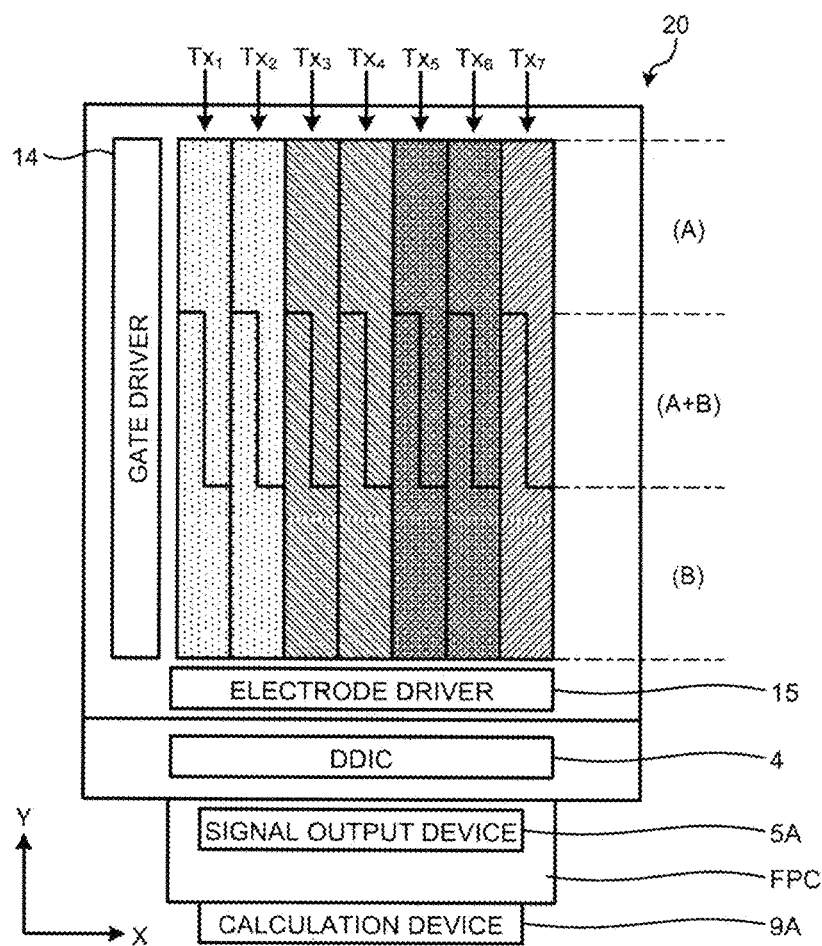
FIG. 19 is a diagram illustrating exemplary shapes of the divided electrodes and exemplary drive electrode blocks driven by an electrode driver in the second embodiment.

FIG. 19 is a diagram illustrating exemplary shapes of the divided electrodes and exemplary drive electrode blocks driven by the electrode driver 15 in the second embodiment. In FIG. 19, the same shading is applied to one or two electrodes that are regarded as one drive electrode block. That is, in the example illustrated in FIG. 19, a set of the two first electrodes $Tx_1$ and $Tx_2$, a set of the two first electrodes $Tx_3$ and $Tx_4$, a set of the two first electrodes $Tx_5$ and $Tx_6$, and the single first electrode $Tx_7$ each serve as one drive electrode block.

Figure 20:
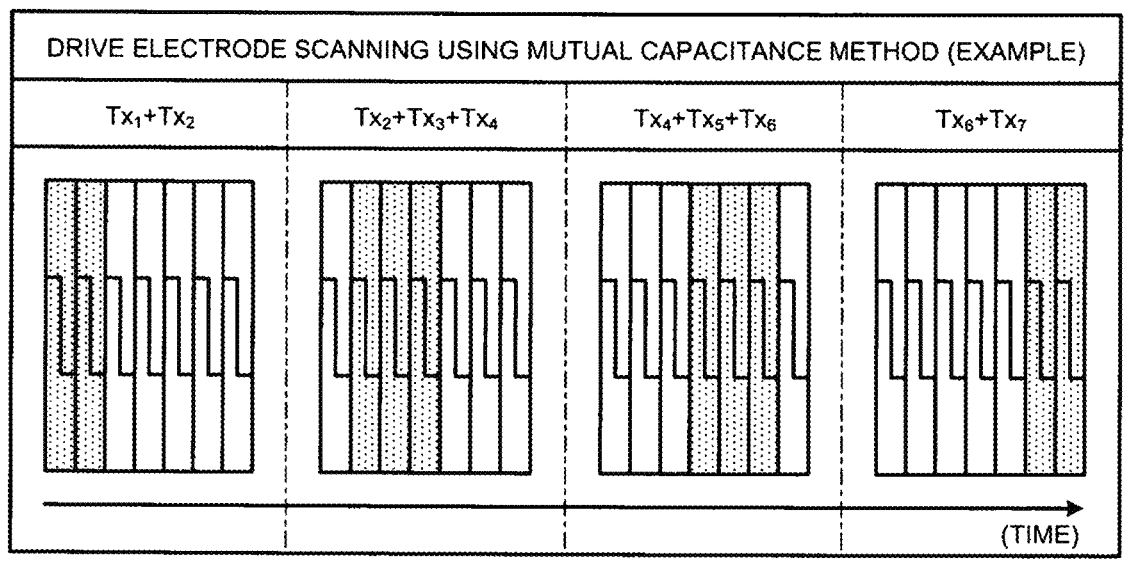
FIG. 20 is a diagram illustrating exemplary drive electrode blocks when shifted driving is employed.

FIG. 20 is a diagram illustrating exemplary drive electrode blocks when shifted driving is employed. The specific form of the drive electrode block is not limited to the example illustrated in FIG. 19, but can be any form. For example, a scheme, such as the shifted driving illustrated in FIG. 20, may be applied, and the first electrodes Tx included in a drive electrode block group driven at first timing may partially overlap the first electrodes Tx included in another drive electrode block group driven at second timing.

Figure 21:
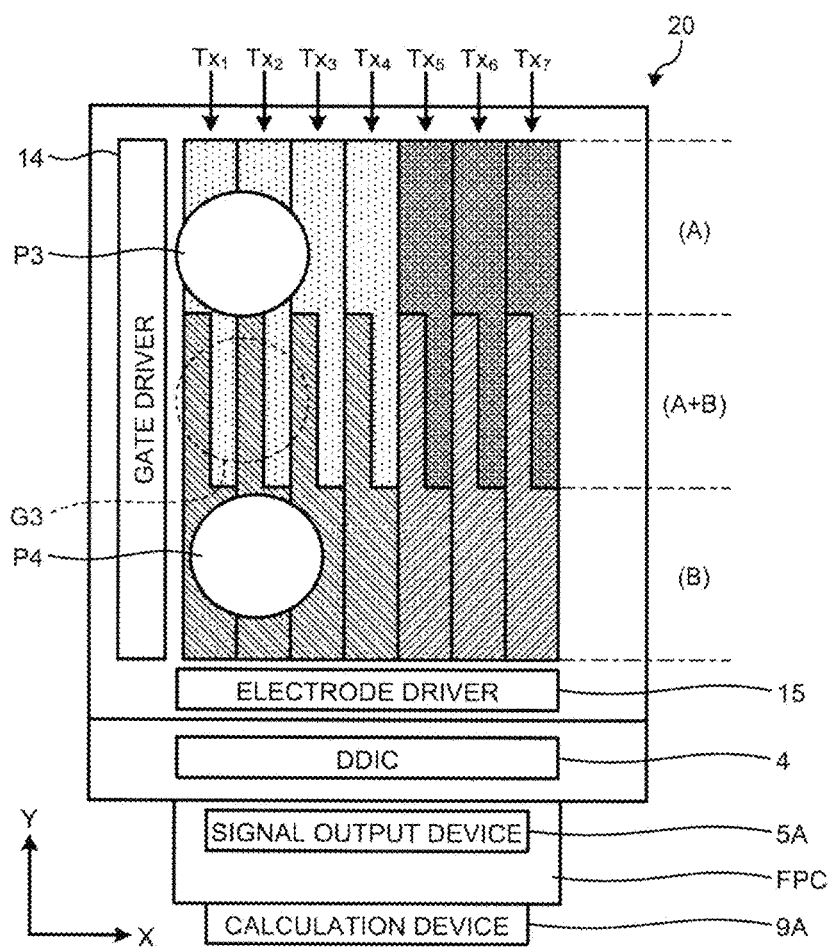
FIG. 21 is a diagram illustrating the first detection regions that are set for the force detection in the second embodiment, the first detection regions being distinguished by different shadings.

FIG. 21 is a diagram illustrating the first detection regions that are set for the force detection in the second embodiment, the first detection regions being distinguished by different shadings. In the second embodiment, for example, as illustrated in FIG. 21, a region including four divided electrodes of the respective first electrodes $Tx_1$, $Tx_2$, $Tx_3$, and $Tx_4$ arranged on the region (A) side is set as one of the first detection regions; another region including four divided electrodes of the respective first electrodes $Tx_1$, $Tx_2$, $Tx_3$, and $Tx_4$ arranged on the region (B) side is set as another of the first detection regions; still another region including three divided electrodes of the respective first electrodes $Tx_5$, $Tx_6$, and $Tx_7$ arranged on the region (A) side is set as still another of the first detection regions; and still another region including three divided electrodes of the respective first electrodes $Tx_5$, $Tx_6$, and $Tx_7$ arranged on the region (B) side is set as still another of the first detection regions. In this manner, in the second embodiment, four first detection regions are set. Also in the second embodiment, switching can be performed between the electrical coupling on a per drive electrode block basis (refer to FIG. 19) and the electrical coupling on a per first detection region basis (refer to FIG. 21), through the same scheme as that for switching the electrical coupling relation of the divided electrodes in the first embodiment (refer to FIG. 12).

In the second embodiment, the divided electrodes in the first electrode Tx have an overlap region in which two divided electrodes are arranged in the second direction (X-direction). Specifically, whereas the three divided electrodes are rectangular in the first embodiment, the two divided electrodes are L-shaped in the second embodiment, as illustrated in FIGS. 19 and 21, for example. A first divided electrode of the two L-shaped divided electrodes is arranged upside-down with respect to a second divided electrode of the two L-shaped divided electrodes such that the first divided electrode and the second divided electrode are fitted to each other. That is, the L-shaped first divided electrode is rotated 180 degrees with respect to the L-shaped second divided electrode in the X-Y plane. This arrangement forms the rectangular first electrode Tx with the longitudinal direction thereof extending along the Y-direction, in the same manner as in the first embodiment. A region (A+B) in which the two divided electrodes fitted to each other serves as the overlap region in which the two divided electrodes are arranged in the X-direction.

In the second embodiment, consider a case where a multi-touch gesture is applied to a plurality of regions (such as the regions (A) and (B)) in which different divided electrodes are disposed in substantially the same positions in the X-direction, such as touch operation positions P3 and P4 illustrated in FIG. 21. In this case, it may be difficult to distinguish the touch operation positions P3 and P4 from a touch operation position G3 in the overlap region (such as the region (A+B)) located in the middle in the Y-direction between the touch operation positions P3 and P4 by using an output (force signal R14) from the force signal output unit 62 in the second embodiment. This is because the force is detected in both the region (A) and the region (B) regardless of whether the operation is a multi-touch gesture to the touch operation positions P3 and P4 or the operation is a single-touch gesture to the touch operation position G3. In the case of the second embodiment, however, the mutual capacitance method is employed for the detection of the touch operation positions. Therefore, ghosts are restrained from occurring through a scheme carried out using the self-capacitance method. As a result, in the second embodiment, when the position of the touch operation is obtained based on the touch detection signal R2 output from the mutual capacitance signal output unit 72, the position of the touch operation where the force is applied can be simultaneously obtained.

In the second embodiment, the touch operation position may be detected using the self-capacitance method in the same manner as in the first embodiment, in addition to detecting the touch operation position using the mutual capacitance method. Assume a case where water is present, such as in the form of moisture beads attached onto the touch detection surface, in the detection region at an amount sufficient to affect the electrostatic capacitance and at a level sufficient to cause false recognition of a touch operation at a location different from the touch operation position. In this case, a position where no touch operation is performed may be detected as a touch operation position. In the self-capacitance method, such an influence of water is restrained. Hence, the touch detection can be more accurately performed by employing both the mutual capacitance method and the self-capacitance method.

Specifically, in the second embodiment, the first electrodes Tx are bundled, for example, in the same combination of the drive electrode blocks as that illustrated in FIG. 20, and the X-directional touch position detection is performed using the self-capacitance method. In the second embodiment, the position of the touch operation is obtained by the touch position detection in the two-dimensional directions (XY directions) using the mutual capacitance method. Therefore, the touch position detection using the self-capacitance method only needs to have resolution high enough to be capable of eliminating the above-described influence of water. Consequently, the resolution of the touch position detection using the self-capacitance method in the second embodiment may be lower than the resolution in the first embodiment, and hence, the number of the self signal output units DA included in the signal output device 5A can be easily reduced. The reduction in the number of the self signal output units DA can reduce the circuit size of the signal output device 5A.

The calculation device 9A of the second embodiment is a circuit that serves as a touch calculation unit 91A, instead of the touch calculation unit 91 in the calculation device 9 of the first embodiment. Whereas the touch calculation unit 91 calculates the position of the touch operation based on the outputs (first and second signals R11 and R12) generated using the self-capacitance method, the touch calculation unit 91A calculates the position of the touch operation based on the output (touch detection signal R2) generated using the mutual capacitance method. Specifically, for example, assuming the electrode patterns of the first electrodes Tx and the second electrodes Rx configuring the capacitance touch sensors in the matrix configuration in the detection region, the touch calculation unit 91A performs the calculation to identify the position of a capacitance touch sensor that has detected the touch operation based on the relation between the drive timing of the first electrodes Tx and the output of the second electrodes Rx.

The calculation device 9A serves as a touch correction unit 93A, instead of the touch correction unit 93 in the calculation device 9. Whereas the touch correction unit 93 corrects the position of the touch operation based on the calculation result of the force calculation unit 92, the touch correction unit 93A corrects the results of the mutual capacitance detection of the touch operation positions that have been output from the touch calculation unit 91A so as to reduce the influence of water. Specifically, the touch correction unit 93A holds, among the touch detection positions indicated by the outputs from the touch calculation unit 91A, touch detection positions that are also included in touch detection positions identified with the same method as that of the first embodiment based on, for example, the first and second signals R11 and R12, and eliminates touch detection positions that are not included therein. As described above, the calculation device 9A of the second embodiment serves as the touch calculation unit 91A that calculates, based on the mutual capacitance signals, the two-dimensional positions where the touch operations have been performed, and as the touch correction unit 93A that corrects, based on the first signal R11, the two-dimensional positions calculated by the touch calculation unit 91A.

Figure 22:
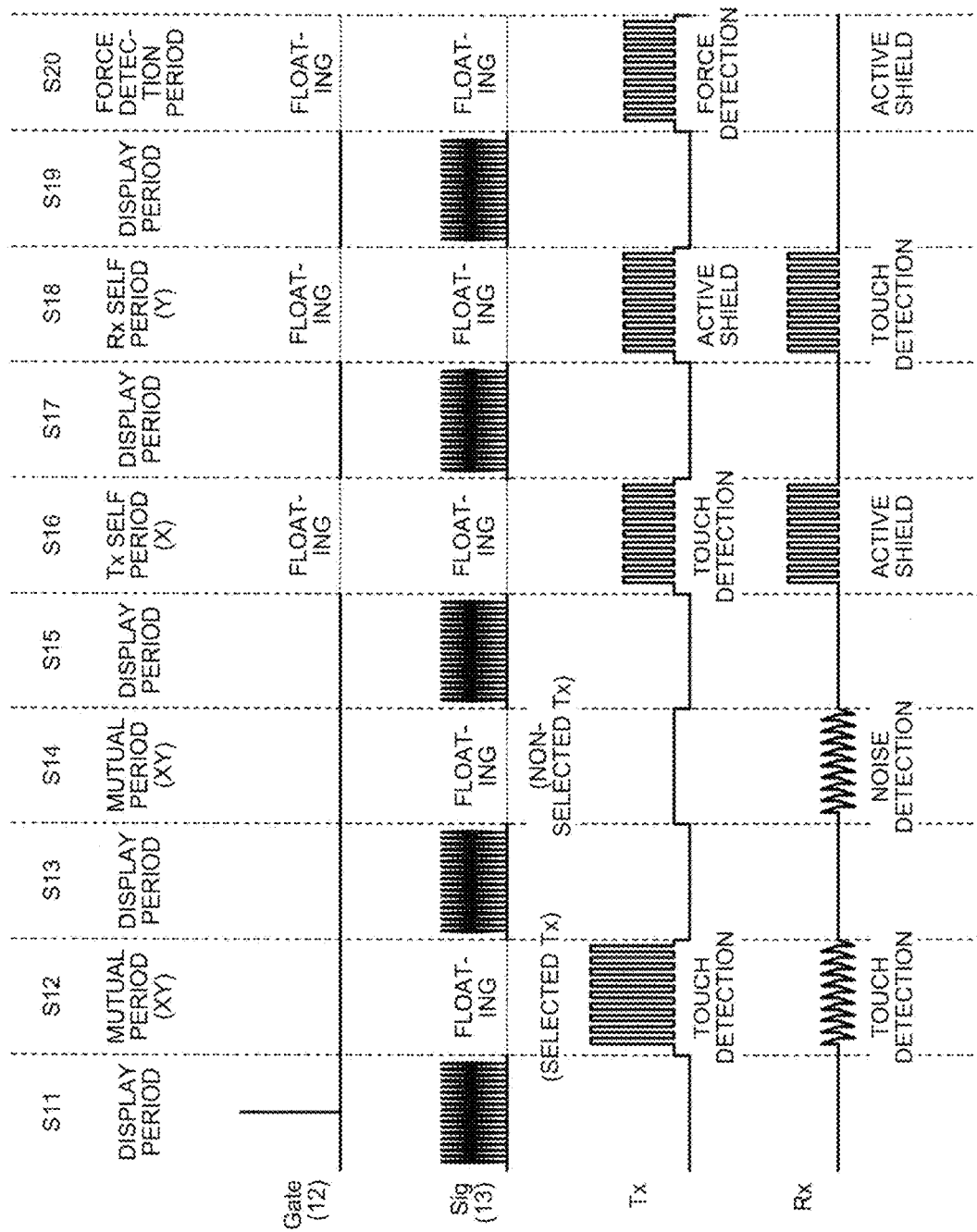
FIG. 22 is a timing diagram illustrating an exemplary relation between the signals on the scanning lines, the signal lines, the first electrodes, and the second electrodes in the second embodiment.

FIG. 22 is a timing diagram illustrating an exemplary relation between the signals on the scanning lines 12, the signal lines 13, the first electrodes Tx, and the second electrodes Rx in the second embodiment. In the second embodiment, in the same manner as in the first embodiment, the display period (each of Steps S11, S13, S15, S17, and S19) in which the display output is performed and the detection period (each of Steps S12, S14, S16, S18, and S20) are alternately provided, as illustrated, for example, in FIG. 22. The detection period in the second embodiment refers to a period in which any one of the following is performed: the touch position detection in the two-dimensional directions (XY directions) using the mutual capacitance method, the touch position detection in the X-direction using the self-capacitance method, the touch position detection in the Y-direction using the self-capacitance method, and the force detection. The display period in the second embodiment is the same as the display period in the first embodiment. The period of the touch position detection in the X-direction using the self-capacitance method, the period of the touch position detection in the Y-direction using the self-capacitance method, and the period of the force detection (Steps S16, S18, and S20) in the second embodiment are the same as those periods in the first embodiment. Although FIG. 22 does not illustrate periods of Step S21 and later, the periods of Steps S11 to S20 are actually repeated in the same sequence during the periods of Step S21 and later. The order of Steps S12, S14, S16, S18, and S20 may be changed. Steps S11, S13, S15, . . . may be performed before or after Steps S12, S14, S16, . . . , respectively.

A period of touch position detection using an electrostatic capacitance method includes a period of touch detection (Step S12) and a period of noise detection (Step S14). In the period of Step S12, the mutual capacitance signal output unit 72 obtains an output according to scanning of the drive electrode blocks from the second electrodes Rx. In the period of Step S14, the mutual capacitance signal output unit 72 obtains an output indicated by the electrostatic capacitances between unscanned drive electrode blocks and the second electrodes Rx as a noise component. The mutual capacitance signal output unit 72 eliminates the noise component obtained at Step S14 from the output obtained at Step S12 to output the touch detection signal R2. During the periods of Steps S12 and S14, the signal lines 13 are in the floating state. During the periods of Steps S12 and S14, the scanning lines 12 are in the same coupled state as that in the display period.

As described above, according to the second embodiment, the two-dimensional position where the touch operation has been performed is obtained based on the mutual capacitance. This enables obtaining information more accurately indicating the position where the touch operation has been performed. In particular, it has been described with reference to FIG. 22 that the mutual capacitance touch detection, the self-capacitance touch detection, and the force detection are combined. This combination can achieve the more reliable elimination of ghosts by use of the mutual capacitance touch detection, the restraint of the influence of water by use of the self-capacitance touch detection, and the detection of the position and level of the force by the force detection. Thus, the position and force of the touch operation can be more accurately detected. That is, according to the second embodiment, the position and force of the touch operation can be more accurately detected than is possible by the combination of the self-capacitance touch detection and the force detection or the combination of the mutual capacitance touch detection and the force detection.

Since the two-dimensional position obtained using the mutual capacitance method is corrected based on the position obtained using the self-capacitance method, the influence of water in mutual capacitance method can be reduced, and thus, the touch detection can be more accurately performed.

Since the divided electrodes have the overlap region in which two divided electrodes are arranged in the second direction (X-direction), the resolution can be increased in the first direction (Y-direction) with fewer divided electrodes.

Modification of Second Embodiment

The following describes a modification of the second embodiment. In the description of the modification, the same configurations as those in the second embodiment will be assigned the same reference signs, and will not be described in some cases.

Figure 23:
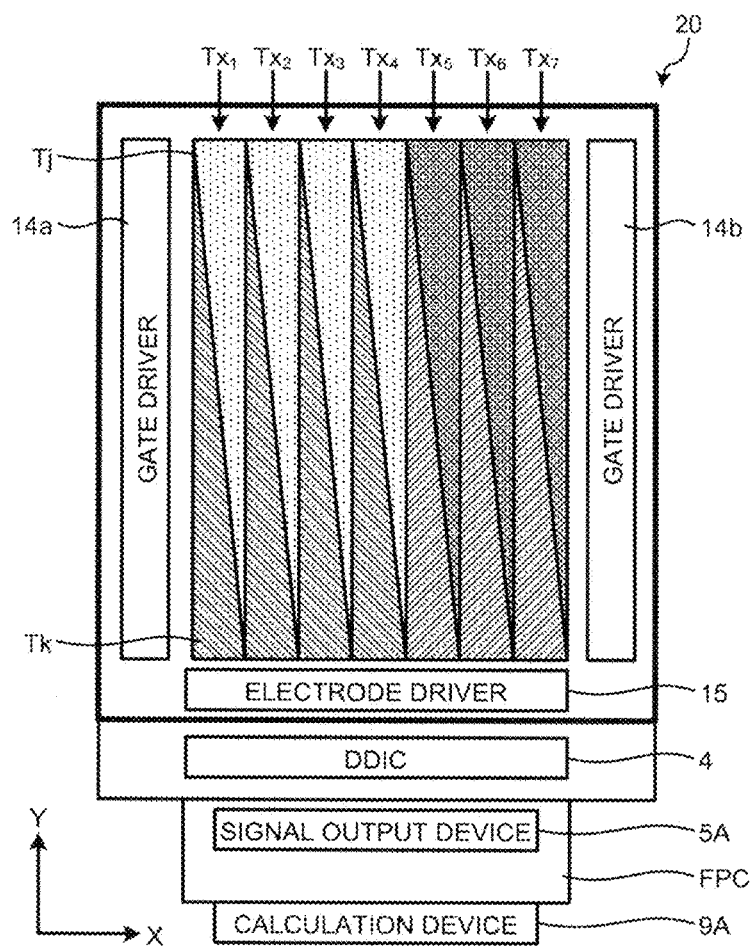
FIG. 23 is a diagram illustrating the shapes of the divided electrodes and the first detection regions that are set for the force detection in a first modification, the first detection regions being distinguished by different shadings.

FIG. 23 is a diagram illustrating the shapes of the divided electrodes and the first detection regions that are set for the force detection in a first modification, the first detection regions being distinguished by different shadings. In the first modification, the respective divided electrodes included in the first electrode Tx have a shape tapered or inversely tapered in the first direction (Y-direction). Specifically, as illustrated, for example, in FIG. 23, the first electrode Tx of the first modification includes divided electrodes Tj and Tk obtained by dividing the first electrode Tx into two parts by a parting line tracing one of the two diagonal lines of a rectangle representing the shape of the first electrode Tx. The divided electrodes Tj and Tk in the first modification have the same configurations as those of the divided electrodes of the second embodiment, except that the shapes are different. When the electrode driver 15 side is assumed as one end side, the divided electrode Tk has a tapered shape thinned toward the other end side, and the divided electrode Tj has an inversely tapered shape thickened toward the other end side.

Figure 24:
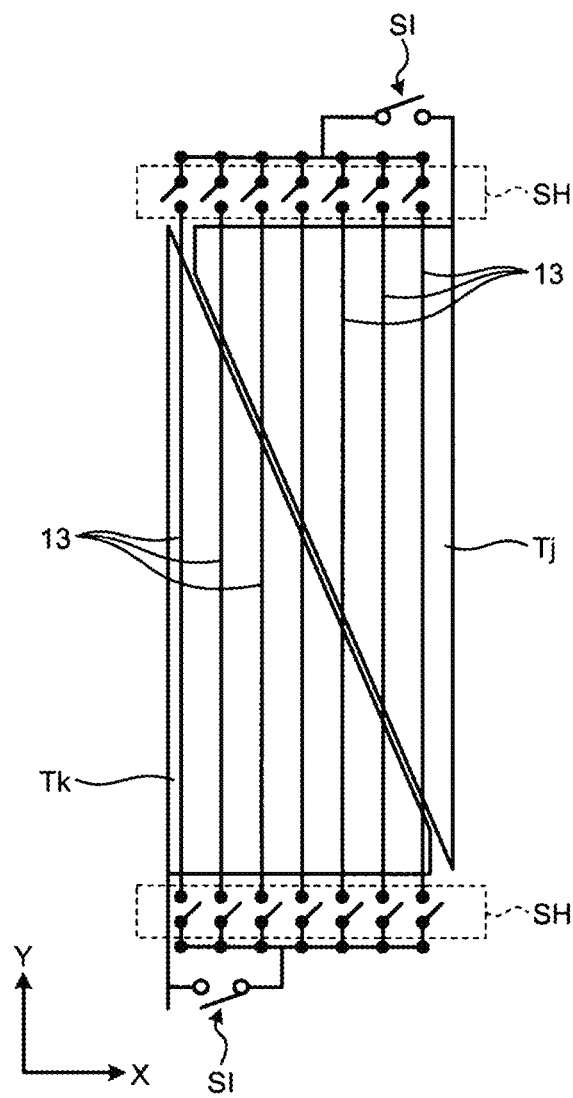
FIG. 24 is a diagram schematically illustrating an exemplary relation of the divided electrodes and the signal lines, the divided electrodes each having a tapered or inversely tapered shape.

FIG. 24 is a diagram schematically illustrating an exemplary relation of the divided electrodes and the signal lines 13, the divided electrodes each having a tapered or inversely tapered shape. In the first modification, a switch unit SH is provided that switches between coupling and decoupling of the signal lines 13 to and from the DDIC 4, and places the signal lines 13 in the floating state while the signal lines 13 are decoupled. In the first modification, a switch unit SI is provided that opens and closes coupling paths for electrically coupling together the divided electrodes Tj and the divided electrodes Tk through the signal lines 13. In the first modification, the switch units SH and SI are placed in the coupled state during the periods when the touch position detection in the two-dimensional directions (XY directions) is performed using the mutual capacitance method (at Steps S12 and S14), when the touch position detection in the X-direction is performed using the self-capacitance method (at Step S16), and when the touch position detection in the Y-direction is performed using the self-capacitance method (at Step S18). With this configuration, the divided electrodes Tj and the divided electrodes Tk can be short-circuited with each other through the signal lines 13 to form an electrical configuration in which the divided electrodes Tj and Tk and the signal lines 13 are continuously coupled, the electrical configuration being capable of acting as one electrode. Thus, the accuracy of detection of the touch operation position is improved. At least the switch unit SH is placed in the decoupled state during the period of the force detection (Step S20). This operation can place the signal lines 13 in the floating state to restrain the noise from propagating through the signal lines 13.

Figure 25:
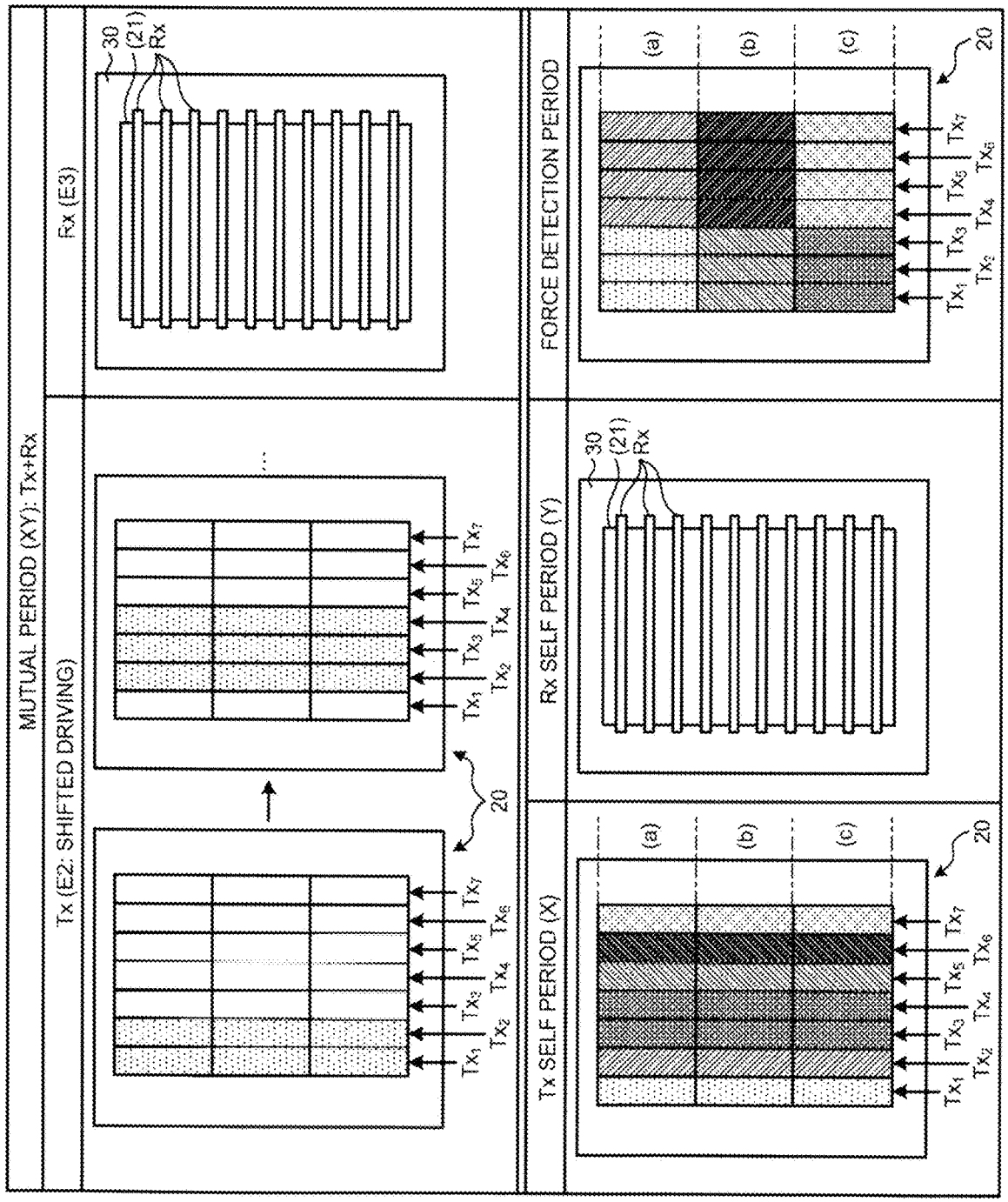
FIG. 25 is an explanatory diagram illustrating another exemplary specific embodiment according to the second embodiment.

FIG. 25 is an explanatory diagram illustrating another exemplary specific embodiment according to the second embodiment. While the modification of the second embodiment has been described with reference to FIGS. 23 and 24, in the second embodiment, the specific forms of the divided electrodes included in the first electrode Tx can be modified as appropriate, in the same manner as in the first embodiment. For example, as illustrated in FIG. 25, the divided electrodes in the first embodiment (refer to FIG. 8 and other figures) may be used as the divided electrodes in the second embodiment. FIG. 25 illustrates that both the first electrodes Tx serving as the drive electrode E2 and the second electrodes Rx serving as the touch detection electrode E3 are used in "Mutual period (XY)" in the second embodiment, that is, in the period of touch position detection using the electrostatic capacitance method (Steps S12 and S14). In FIG. 25, the shifted driving (refer to FIG. 20) is employed for the first electrodes Tx serving as the drive electrode E2. The specific driving method can, however, be modified as appropriate. In FIG. 25, the same shading is applied to one or two first electrodes Tx that are regarded as one electrode in the touch position detection in the X-direction using the self-capacitance method (at Step S16) (refer to FIG. 8). FIG. 25 illustrates the second electrodes Rx used in the touch position detection in the Y-direction using the self-capacitance method (at Step S18) (refer to FIG. 9). FIG. 25 uses shading to distinguish between groups of the divided electrodes (refer to FIG. 11), each of the groups serving as a single first detection region during the force detection period (Step S20). The example illustrated in FIG. 25 can employ the same configuration as that of the first embodiment as a configuration for switching the electrical coupling relation of the divided electrodes (refer to FIG. 12). In this manner, the features according to the second embodiment that are the same as the features according to the first embodiment may have the same configuration as that of the features according to the first embodiment. In a converse manner, the features in the second embodiment and the modification thereof described with reference to FIGS. 19, 21, and 23 may be employed in the first embodiment. Embodiments are not limited to the example illustrated in FIG. 25. Some or all of the divided electrodes arranged in the Y-direction as exemplified in the first embodiment may have an overlap region, such as that described with reference to FIG. 19, or may each have a tapered or inversely tapered shape, such as that described with reference to FIG. 23.

Third Embodiment

The following describes a third embodiment that is an embodiment different from the first and the second embodiments. In the description of the third embodiment, the same configurations as those in the first and the second embodiments will be assigned the same reference signs, and will not be described in some cases.

Figure 26:
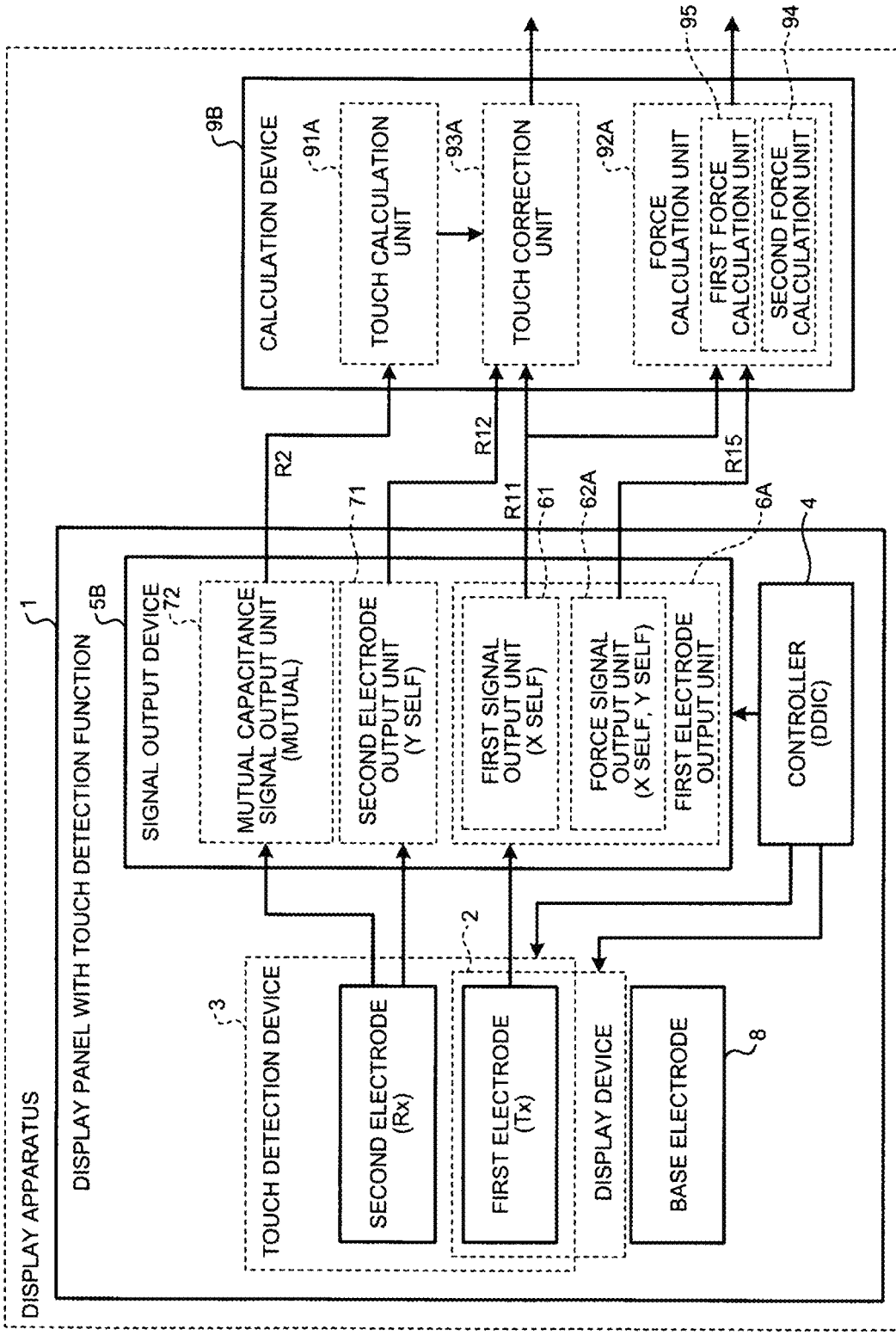
FIG. 26 is a block diagram illustrating a main configuration example of a display apparatus according to a third embodiment.

FIG. 26 is a block diagram illustrating a main configuration example of a display apparatus 100B according to the third embodiment. The display apparatus 100B of the third embodiment includes a signal output device 5B, instead of the signal output device 5A in the display apparatus 100A of the second embodiment. The display apparatus 100B of the third embodiment also includes a calculation device 9B, instead of the calculation device 9A of the second embodiment. The scheme of the detection of the touch operation position in the third embodiment is, for example, a scheme in which the position detection in the two-dimensional directions (XY directions) using the mutual capacitance method is corrected using the self-capacitance method. This scheme is the same as that of the second embodiment.

Figure 27:
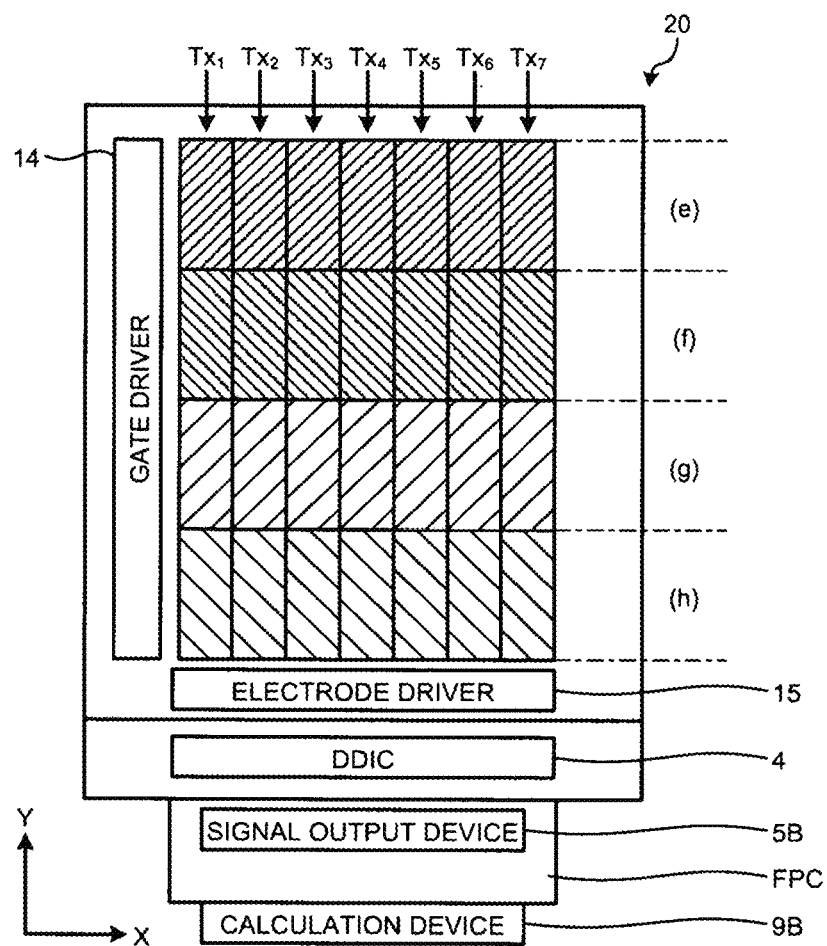
FIG. 27 is a diagram illustrating the shapes of the divided electrodes and the first detection regions that are set for the force detection in the third embodiment, the first detection regions being distinguished by different shadings.

FIG. 27 is a diagram illustrating the shapes of the divided electrodes and the first detection regions that are set for the force detection in the third embodiment, the first detection regions being distinguished by different shadings. In the third embodiment, as illustrated, for example, in FIG. 27, each of the first electrodes Tx includes four divided electrodes. The four divided electrodes are arranged such that all or most of the area of the divided electrode is located in a corresponding one of regions (e), (f), (g), and (h). The first electrode Tx has a length equal to or larger than the width of the display area 21 in the Y-direction, and the regions (e), (f), (g), and (h) are set so as to divide the first electrode Tx into four equal parts (refer, for example, to FIG. 30) in the Y-direction. In the example illustrated in FIG. 27, each of the regions (e), (f), (g), and (h) is set as a first detection region. This is, however, merely an example, and the first detection regions are not limited to the example, but can be modified as appropriate.

The signal output device 5B is the same as the signal output device 5A, except that the force signal output unit 62 in the signal output device 5A serves as a force signal output unit 62A. The output (force signal R15) of the force signal output unit 62A includes, in addition to the same output as that of the force signal output unit 62 of the first and the second embodiments, an output obtained using second detection regions that are set separately from the first detection regions. The second detection regions are, for example, regions provided with the respective first electrodes $Tx_1$, $Tx_2$, ..., and $Tx_7$. That is, each of the second detection regions in the third embodiment is a region in which one of the first electrodes Tx is disposed. Each of the second detection regions may be a region in which one or more of the first electrodes Tx is/are disposed. For example, the second detection region may be a region in which two of the first electrodes Tx are disposed in the same combination as that of the drive electrode block illustrated in FIG. 19.

Figure 28:
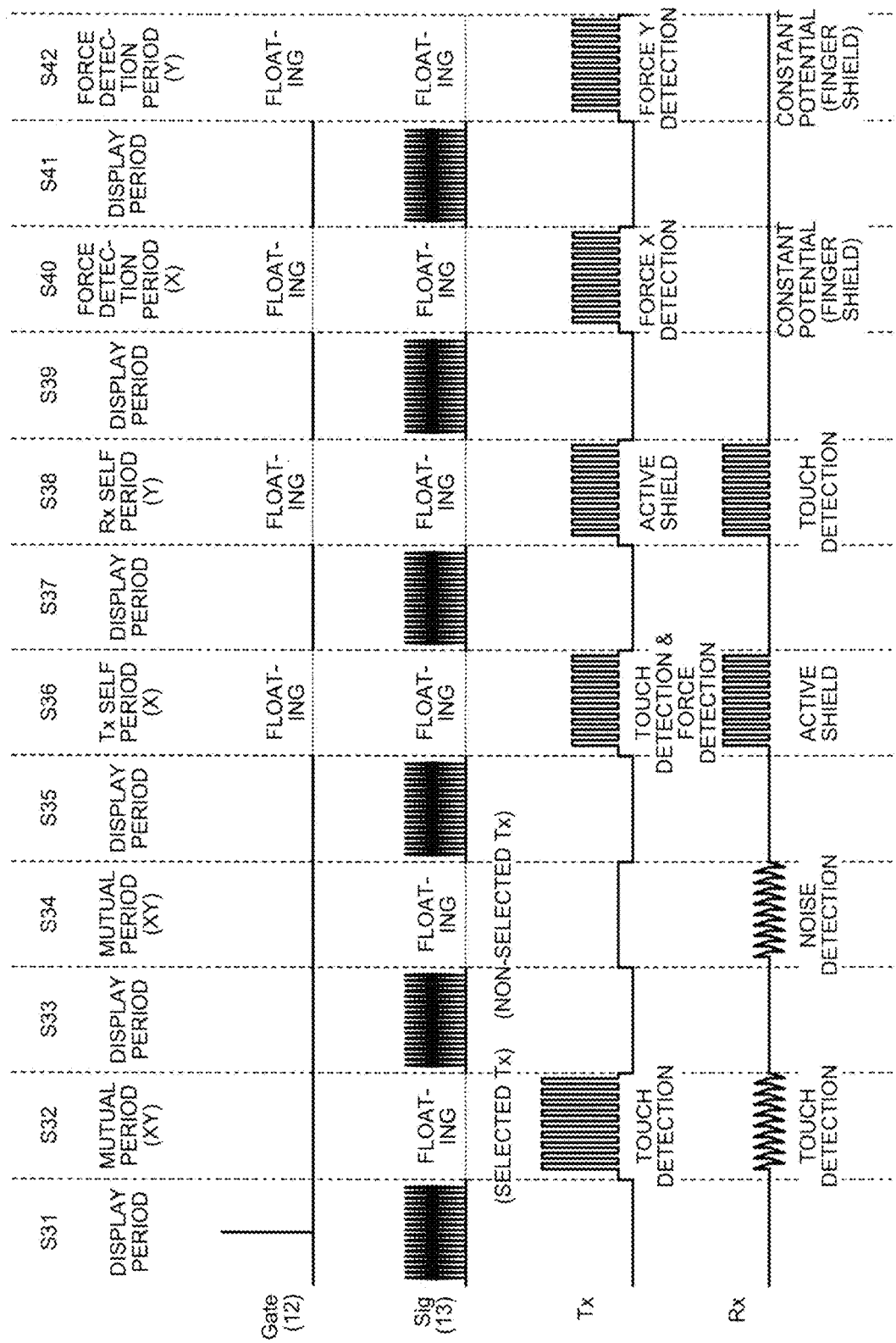
FIG. 28 is a timing diagram illustrating an exemplary relation between the signals on the scanning lines, the signal lines, the first electrodes, and the second electrodes in the third embodiment.

FIG. 28 is a timing diagram illustrating an exemplary relation between the signals on the scanning lines 12, the signal lines 13, the first electrodes Tx, and the second electrodes Rx in the third embodiment. In the third embodiment, in the same manner as in the first and the second embodiments, the display period (each of Steps S31, S33, S35, S37, S39, and S41) in which the display output is performed and the detection period (each of Steps S32, S34, S36, S38, S40, and S42) are alternately provided, as illustrated in FIG. 28, for example. The detection period in the third embodiment refers to a period in which any one of the following is performed: the touch position detection in the two-dimensional directions (XY directions) using the mutual capacitance method, the touch position detection in the X-direction using the self-capacitance method, the touch position detection in the Y-direction using the self-capacitance method, the force detection in the X-direction, and the force detection in the Y-direction. The display period in the third embodiment is the same as the display period in the first and the second embodiments. The periods of the touch position detection in the two-dimensional directions (XY directions) using the mutual capacitance method, the touch position detection in the X-direction using the self-capacitance method, and the touch position detection in the Y-direction using the self-capacitance method (Steps S32, S34, S36, and S38) in the third embodiment are the same as those periods in the second embodiment. The touch position detection in the X-direction using the self-capacitance method at Step S36 is performed on a per second detection region basis. Although FIG. 28 does not illustrate periods of Step S43 and later, the periods of Steps S31 to S42 are actually repeated in the same sequence during the periods of Step S43 and later. The order of Steps S32, S34, S36, S38, S40, and S42 may be changed. Steps S31, S33, S35, ... may be performed before or after Steps S32, S34, S36, ..., respectively.

The force detection in the X-direction at Step S40 is performed on a per second detection region basis. The scanning lines 12 and the signal lines 13 are in the floating state during the period of Step S40. The second electrodes Rx have a predetermined potential (fixed potential) during the period of Step S40. The period of Step S36 serves as a first period. The period of Step S40 serves as a second period.

Figure 29:
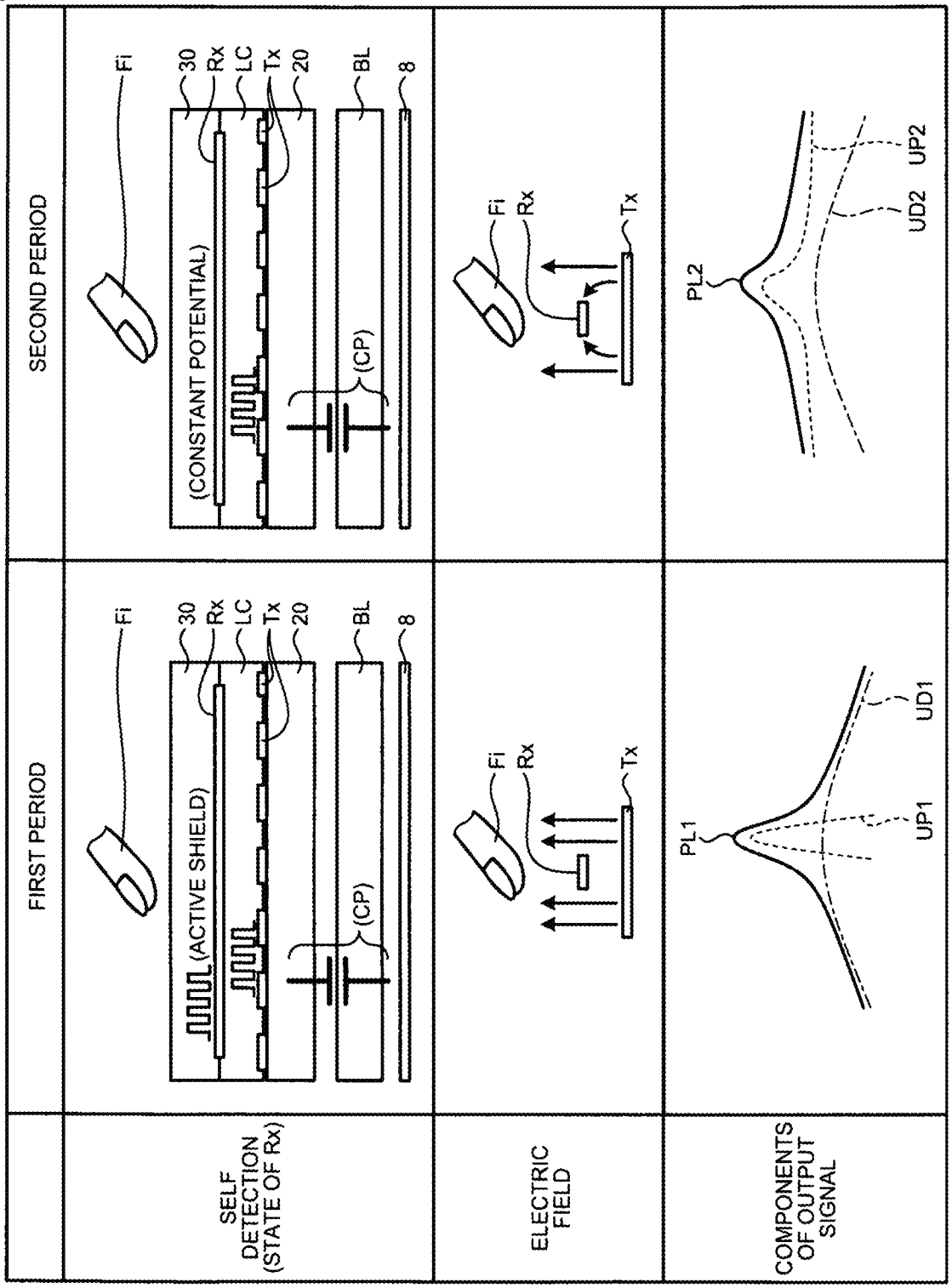
FIG. 29 is a diagram schematically illustrating differences between a first period and a second period.

FIG. 29 is a diagram schematically illustrating differences between the first period and the second period. In the first period, such as at Step S36, the second electrodes Rx are in the active shield state of having a varying potential. This state prevents the electric field generated between the first electrode Tx and an external capacitance (such as one induced by the finger Fi or the like) from being directed toward the second electrode Rx. During the above-described first period, a combined component PL1 is obtained as a component of an output signal from the first electrode Tx that serves as the self-capacitance touch detection electrode E1. The combined component PL1 is a component obtained by combining a component UP1 (upper component) induced by the electric field between the first electrode Tx and the finger Fi or the like with a component UD1 (lower component) produced by an electrostatic capacitance CP corresponding to the distance In between the first electrode Tx and the base electrode 8. Accordingly, the combined component PL1 is obtained by Expression (1) given below.

$$PL1 = UP1 + UD1 \qquad (1)$$

In the second period, such as at Step S40, the second electrode Rx has the fixed potential. This state directs a part of the electric field generated between the first electrode Tx and the external capacitance (such as that induced by the finger Fi or the like) toward the second electrode Rx. During the above-described second period, a combined component PL2 is obtained as a component of the output signal from the first electrode Tx that serves as the self-capacitance touch detection electrode E1. The combined component PL2 is a component obtained by combining together a component UP2 (upper component) induced by the electric field between the first electrode Tx and the finger Fi or the like, a component UD2 (lower component) produced by the electrostatic capacitance CP corresponding to the distance In between the first electrode Tx and the base electrode 8, and a component (Z) that is added because the second electrode Rx has the fixed potential.

The components UD1 and UD2 of the combined components PL1 and PL2 are components representing the force. The component UD1 is equal to the component UD2 when the touch operation position and the force in the first period are equal to those in the second period. In this case, using a fixed value ($\alpha$) corresponding to the state of the second electrodes Rx to express an influence that is exerted on the component UP2 because the second electrode Rx has the fixed potential, the following can be obtained: $UP2=UP1/\alpha$. Taking these into account, the combined component PL2 is obtained by Expression (2) given below.

$$PL2 = UP2 + UD2 + Z \qquad (2)$$
$$= (UP1/\alpha) + UD1 + Z$$

The value of $\alpha$ can be obtained based on the setting of the fixed potential of the second electrode Rx. The component (Z) that is added because the second electrode Rx has the fixed potential can be obtained by measuring the component in advance when no touch operation is performed. Accordingly, the component UD1 can be obtained by solving the simultaneous equations including Expressions (3) and (4) below based on Equations (1) and (2) above. That is, the force can be detected based on the output signal obtained in the first period and the output signal obtained in the second period. A force calculation unit 92A of the calculation device 9B is a circuit that calculates the force based on the scheme explained using Expressions (1) to (4).

$$UD1=PL1-UP1 \qquad (3)$$
$$UD1=PL2-(UP1/\alpha)-Z \qquad (4)$$

In this manner, the force signal in the third embodiment includes the information represented by the electrostatic capacitances in the second detection regions obtained by individually performing, in each of the first period and the second period, detection of the electrostatic capacitance formed by the first electrodes Tx in a single second detection region and the base electrode 8 for each of the second detection regions. The first period is a period in which the second electrodes Rx are in the active shield state of having a varying potential and the second period is a period in which the second electrodes Rx have the fixed potential. The output in the period of Step S36 is the output (first signal R11) from the first signal output unit 61. Thus, in the third embodiment, the first signal R11 is used by the force calculation unit 92A of the calculation device 9B. The force calculation unit 92A serves as a second force calculation unit 94 that calculates the level of the force and the position in the second direction (X-direction) where the force is applied, based on the difference between the electrostatic capacitances in the second detection regions obtained in the first period and the electrostatic capacitances in the second detection regions obtained in the second period. The first signal R11 in the third embodiment is also used by the touch correction unit 93A of the calculation device 9B, in the same manner as in the second embodiment.

The force detection in the Y-direction at Step S42 of FIG. 28 is the same as the force detection in the first embodiment, that is, the force detection performed on a per first detection region basis. The force can be more accurately detected by using both the detection result of the force based on such force detection and the detection result of the force based on the output signal in the first period and the output signal in the above-described second period. The scanning lines 12 and the signal lines 13 are in the floating state during the period of Step S42. The second electrodes Rx have the predetermined potential (fixed potential) during the period of Step S42.

In the third embodiment, the force detection using the first detection regions at Step S42 may be regarded as the second period. In this case, a new period may be set that serve as the first period in which the first detection regions are used. Specifically, a period is set in which the self-capacitance touch detection is performed using the first detection regions while placing the second electrodes Rx in the active shield state of having a varying potential. As a result, the force detection can be performed using the same scheme as the scheme for obtaining the above-described component UD1, based on the output signal of the new period and the output signal of the period of Step S42. In this case, the force signal output from the signal output device 5B in the third embodiment includes the information represented by the electrostatic capacitances in the first detection regions that has been obtained by the individual detection in the first period in which the second electrodes Rx are in the active shield state of having a varying potential, and also includes the information represented by the electrostatic capacitances in the first detection regions that has been obtained by the individual detection in the second period in which the second electrodes Rx have the fixed potential. The force calculation unit 92A serves as a first force calculation unit 95 that calculates the level of the force and the position in the first direction (Y-direction) where the force is applied, based on the difference between the electrostatic capacitances in the first detection regions obtained during the first period and the electrostatic capacitances in the first detection regions obtained during the second period. The new period may be set by replacing the period of Step S38.

Figure 30:
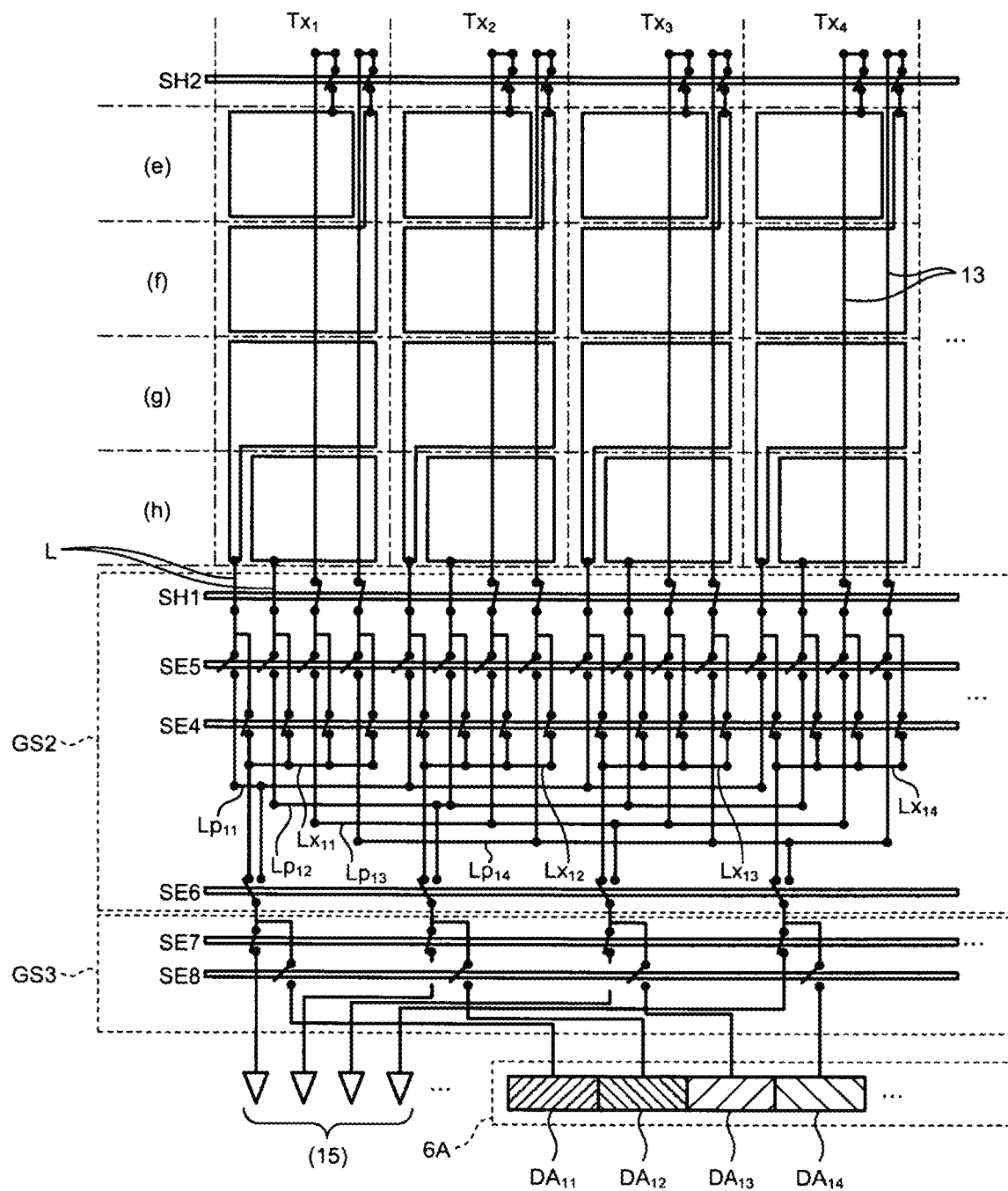
FIG. 30 is a circuit diagram schematically illustrating an exemplary configuration for switching the electrical coupling relation of the divided electrodes in the third embodiment.

FIG. 30 is a circuit diagram schematically illustrating an exemplary configuration for switching the electrical coupling relation of the divided electrodes in the third embodiment. The shadings of the divided electrodes in FIG. 27 correspond to the shadings of self signal output units $DA_{11}$, $DA_{12}$, $DA_{13}$, and $DA_{14}$ in FIG. 30. That is, the divided electrodes are coupled to the self signal output units $DA_{11}$, $DA_{12}$, $DA_{13}$, and $DA_{14}$ shaded with the same shadings as those of the respective divided electrodes.

Some of the divided electrodes may each have an extending portion that serves also as wiring. Specifically, as illustrated, for example, in FIG. 30, the divided electrodes arranged in the region (f) each have the extending portion extending into the region (e). The divided electrodes arranged in the region (g) each have the extending portion extending into the region (h). The divided electrodes arranged in the regions (e) and (h) are rectangular, and are arranged so as not to be in contact with the extending portions extending from the adjacent regions in the regions (f) and (g), respectively.

The signal lines 13 may be used as parts of wiring that couples the divided electrodes to the electrode driver 15 (or a first electrode output unit 6A). Specifically, as illustrated, for example, in FIG. 30, the signal lines 13 may be used as wiring for coupling the divided electrodes in the regions (e) and (f) to a switching circuit GS2. More specifically, the signal lines 13 are coupled to the divided electrodes in the region (e) or (f) through a switch unit SH2. The signal lines 13 are coupled to the switching circuit GS2 through a switch unit SH1. Placing the switch units SH1 and SH2 in the coupled state can couple the divided electrodes in the regions (e) and (f) to the switching circuit GS2. Placing the switch units SH1 and SH2 in the decoupled state can decouple the divided electrodes in the regions (e) and (f) from the switching circuit GS2, and can place the signal lines 13 in the floating state.

The coupling paths from the divided electrodes to the electrode driver 15 and the first electrode output unit 6A are provided with the switching circuit GS2 and a switching circuit GS3. The switching circuit GS2 includes, for example, the connection lines L, switch units SE4, SE5, and SE6, first state connection lines $Lx_{11}$, $Lx_{12}$, $Lx_{13}$, $Lx_{14}$, . . . , and second state connection lines $Lp_{11}$, $Lp_{12}$, $Lp_{13}$, and $Lp_{14}$. The switching circuit GS3 includes, for example, switch units SE7 and SE8.

First end sides of the connection lines L are individually coupled to the divided electrodes in the region (g) or the region (h). Second end sides of the connection lines L extend toward the first electrode output unit 6A and are each branched into two lines (hereinafter, referred to as a first branch line and a second branch line in some cases). Second ends of the switches of the switch unit SH1 that is coupled to the divided electrodes that are coupled to the switching circuit GS2 through the signal lines 13 are each branched into two lines (hereinafter, referred to as a first branch line and a second branch line in some cases) in the same manner. The switch unit SE4 is provided for the first branch lines of the connection lines L and for the first branch lines of the second ends of the switches included in the switch unit SH1. The switch unit SE5 is provided for the second branch lines of the connection lines L and for the second branch lines of the second ends of the switches included in the switch unit SH1. The switch units SE4 and SE5 each include switches for switching between electrical coupling and decoupling of the corresponding branch lines.

Each of the first state connection lines $Lx_{11}$, $Lx_{12}$, $Lx_{13}$, and $Lx_{14}$ couples together the second ends of the first branch lines provided with the switch unit SE4. Specifically, the first state connection line $Lx_{11}$ couples together the second ends of the first branch lines that are coupled to the four divided electrodes in the respective regions (e), (f), (g), and (h) in the first electrode $Tx_1$. In the same manner, each of the first state connection lines $Lx_{12}$, $Lx_{13}$, $Lx_{14}$, . . . couples together the second ends of the first branch lines that are coupled to the four divided electrodes in the respective regions (e), (f), (g), and (h) in a corresponding one of the first electrodes $Tx_2$, $Tx_3$, $Tx_4$, Each of the second state connection lines $Lp_{11}$, $Lp_{12}$, $Lp_{13}$, and $Lp_{14}$ couples together the second ends of the second branch lines provided with the switch unit SE5. Specifically, the second state connection line $Lp_{11}$ couples together the second ends of the second branch lines that are coupled to the respective divided electrodes of the first electrodes $Tx_1$, $Tx_2$, . . . , and $Tx_7$ in the region (g); the second state connection line $Lp_{12}$ couples together the second ends of the second branch lines that are coupled to the respective divided electrodes of the first electrodes $Tx_1$, $Tx_2$, . . . , and $Tx_7$ in the region (h); the second state connection line $Lp_{13}$ couples together the second ends of the second branch lines that are coupled to the respective divided electrodes of the first electrodes $Tx_1, Tx_2, \ldots,$ and $Tx_7$ in the region (e); and the second state connection line $Lp_{14}$ couples together the second ends of the second branch lines that are coupled to the respective divided electrodes of the first electrodes $Tx_1, Tx_2, \ldots,$ and $Tx_7$ in the region (f).

The switch unit SE6 couples connection lines for connection with the switching circuit GS3 to either the first state connection lines $Lx_{11}, Lx_{12}, Lx_{13}, Lx_{14}, \ldots$ or the second state connection lines $Lp_{11}, Lp_{12}, Lp_{13},$ and $Lp_{14}$. When the switch unit SE6 is coupled to the first state connection lines $Lx_{11}, Lx_{12}, Lx_{13}, Lx_{14}, \ldots,$ the switch unit SE4 is placed in the coupled state, and the switch unit SE5 is placed in the decoupled state. When the switch unit SE6 is coupled to the second state connection lines $Lp_{11}, Lp_{12}, Lp_{13},$ and $Lp_{14}$, the switch unit SE4 is placed in the decoupled state, and the switch unit SE5 is placed in the coupled state. In this manner, the divided electrodes establish the electrical coupling relation through the routes coupled to the self signal output units $DA_{11}, DA_{12}, DA_{13}, DA_{14}, \ldots$ by the switch unit SE6.

The switching circuit GS3 couples connection lines for connection with the switching circuit GS2 to either the electrode driver 15 or the self signal output units $DA_{11}, DA_{12}, DA_{13}, DA_{14}, \ldots$ included in the first electrode output unit 6A. Specifically, first end sides of the connection lines are coupled to the switching circuit GS2, and second end sides thereof are each branched into two lines (hereinafter, referred to as a first branch line and a second branch line in some cases). The switch unit SE7 includes switches, each of which switches between coupling and decoupling of the first branch line of the two branch lines of a corresponding one of the connection lines to and from the electrode driver 15. The switch unit SE8 includes switches, each of which switches between coupling and decoupling of the second branch line of the two branch lines of a corresponding one of the connection lines to and from a corresponding one of the self signal output units $DA_{11}, DA_{12}, DA_{13}, DA_{14}, \ldots$ included in the first electrode output unit 6A. The self signal output units $DA_{11}, DA_{12}, DA_{13}, DA_{14}, \ldots$ are indicated with subscript numbers so as to be individually identified as the self signal output units DA included in the first electrode output unit 6A. The divided electrodes can be coupled to the electrode driver 15 by placing the switch unit SE7 in the coupled state and the switch unit SE8 in the decoupled state. The divided electrodes can be coupled to the self signal output units $DA_{11}, DA_{12}, DA_{13}, DA_{14}, \ldots$ by placing the switch unit SE7 in the decoupled state and the switch unit SE8 in the coupled state. The configuration exemplified by the switching circuit GS3 enables both the driving of the first electrodes Tx using the mutual capacitance method and the self-capacitance touch detection using the first electrodes Tx. The second embodiment can also employ the same configuration.

Figure 31:
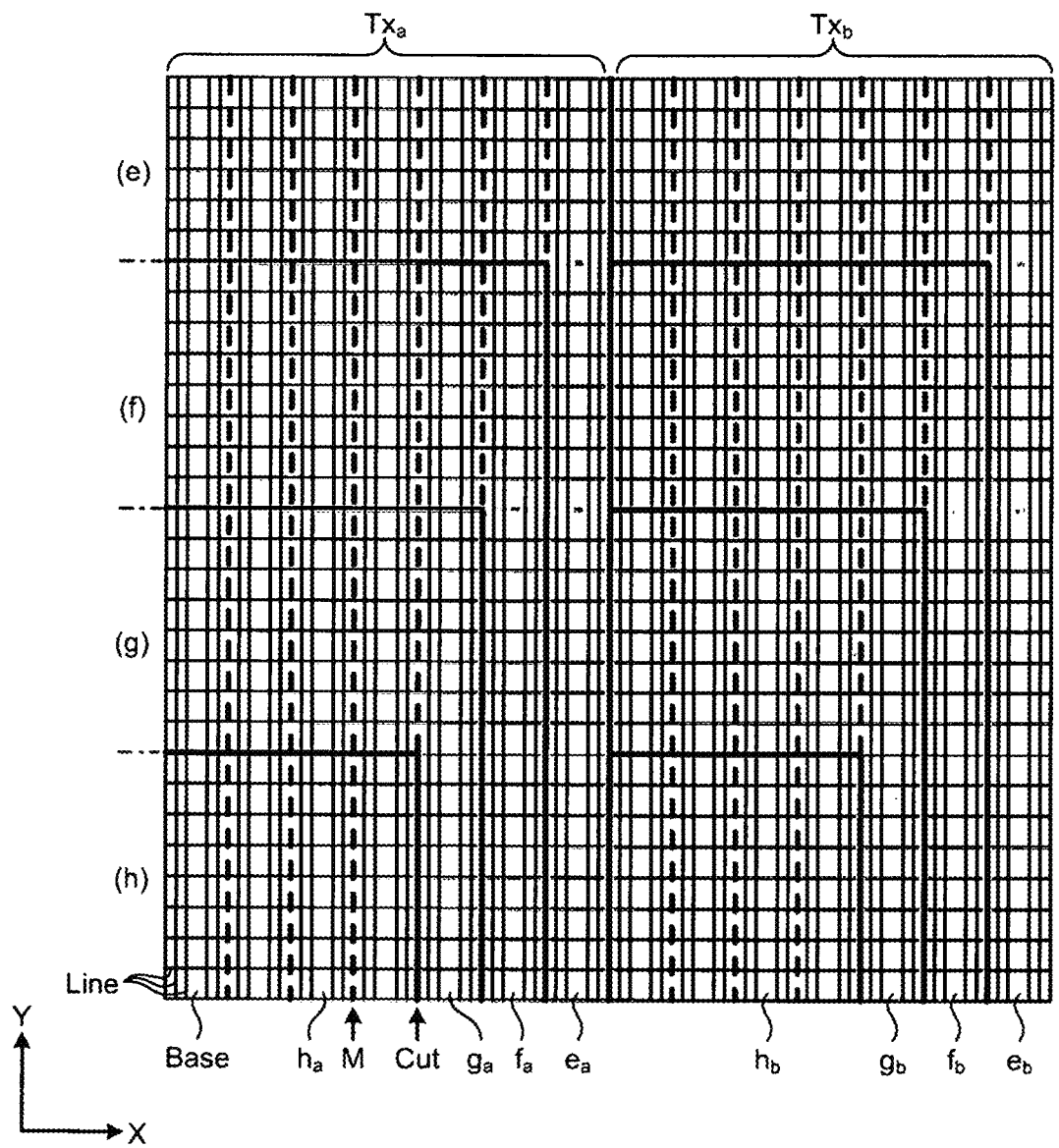
FIG. 31 is a diagram illustrating another form example of the divided electrodes having extending portions.

FIG. 31 is a diagram illustrating another form example of the divided electrodes having the extending portions. In FIG. 31, reference signs $Tx_a$ and $Tx_b$ are assigned to two of the first electrodes Tx arranged along the X-direction. Reference signs $e_a, f_a, g_a, h_a, e_b, f_b, g_b,$ and $h_b$ are assigned to the respective divided electrodes of the first electrodes $Tx_a$ and $Tx_b$ arranged in the respective regions (e), (f), (g), and (h). The respective four divided electrodes in the regions (e), (f), (g), and (h) may be provided so as to be able to be coupled without using the signal lines 13 as connection lines. Specifically, as illustrated, for example, in FIG. 31, the divided electrodes $e_a$ and $e_b$ in the region (e) may have extending portions extending into the regions (f), (g), and (h); the divided electrodes $f_a$ and $f_b$ in the region (f) may have extending portions extending into the regions (g) and (h); and the divided electrodes $g_a$ and $g_b$ in the region (g) may have extending portions extending into the region (h). In this manner, the divided electrodes arranged in regions located relatively far from the electrode driver 15 and the first electrode output unit 6A may be coupled thereto through the extending portions.

The divided electrodes include a film-like transparent electrode Base made using, for example, indium tin oxide (ITO) and metal wiring Line provided in a grid pattern on the transparent electrode Base. The divided electrodes are provided with light transmissivity by the transparent electrode Base, and are provided, by the metal wiring Line, with higher conductivity than that given by only the transparent electrode Base. A layer of the first electrodes Tx is a layer obtained by stacking the transparent electrode Base and the metal wiring Line. The divided electrodes are formed by cutting the layer along cutting parts Cut. In this manner, the divided electrodes are formed in the layer of the first electrodes Tx. Perforations M may be formed in the layer of the first electrodes Tx so as to make the cutting parts Cut less visible.

Figure 32:
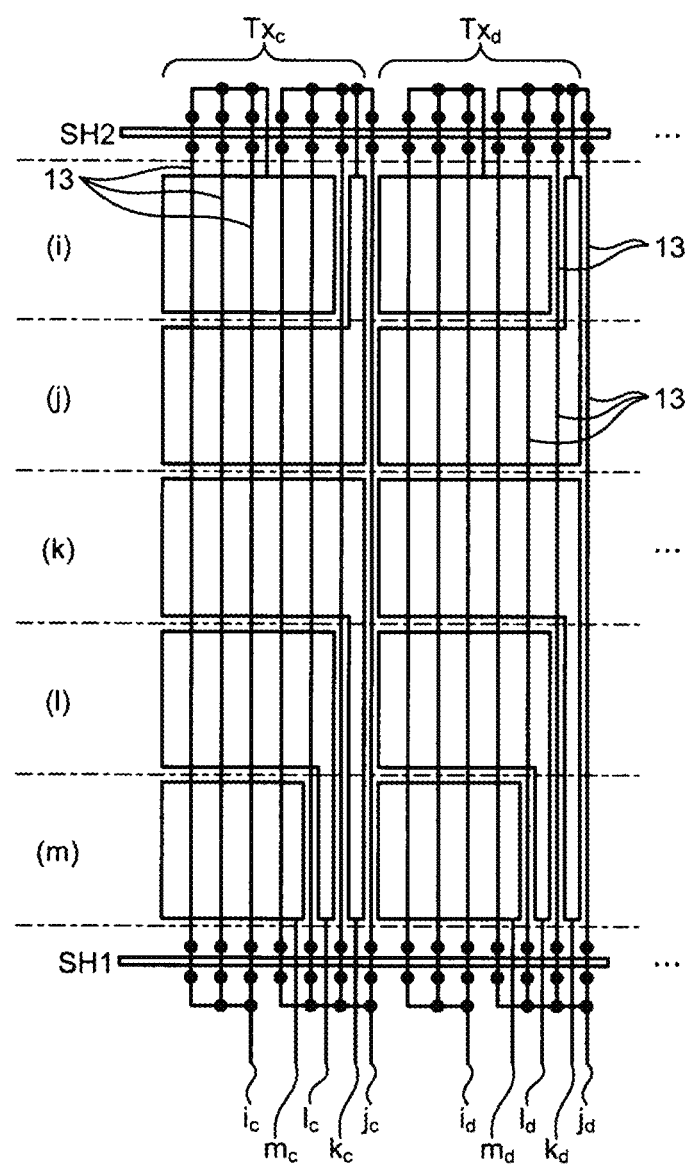
FIG. 32 is a diagram illustrating a form example of using a plurality of signal lines for coupling each of the divided electrodes.

FIG. 32 is a diagram illustrating a form example of using a plurality of signal lines 13 for coupling each of the divided electrodes. In the example illustrated in FIG. 32, reference signs $Tx_c$ and $Tx_d$ are assigned to two of the first electrodes Tx arranged along the X-direction. Reference signs $i_c, j_c, k_c, l_c, m_c, i_d, j_d, k_d, l_d,$ and $m_d$ are assigned to connection lines that can establish an electrical coupling relation with the divided electrodes of the first electrodes $Tx_c$ and $Tx_d$ arranged in regions (i), (j), (k), (l), and (m). In the example illustrated in FIG. 32, the divided electrodes are arranged so that most of the areas thereof are located in the respective regions (i), (j), (k), (l), and (m) that are set so as to divide each of the first electrodes Tx, for example, into five equal parts. The divided electrodes in the region (l) each have an extending portion extending into the region (m). The divided electrodes in the region (j) each have an extending portion extending into the region (i). The divided electrodes in the region (k) each have an extending portion extending into the regions (l) and (m).

In FIG. 32, the divided electrodes arranged in the regions (i) and (j) that are located relatively far from a first end side (lower side in FIG. 32) of the first electrodes Tx provided with the connection lines $i_c, j_c, k_c, l_c, m_c, i_d, j_d, k_d, l_d,$ and $m_d$ establish an electrical coupling relation with the connection lines $i_c, j_c, i_d,$ and $j_d$ through the signal lines 13. Specifically, each of the connection lines $i_c$ and $i_d$ branches into three lines extending toward a second end side of the first electrodes Tx, and the three branch lines pass through three switches of the switch unit SH1, three of the signal lines 13, and three switches of the switch unit SH2, and converge into one line at the second end side to be coupled to a divided electrode in the region (i). Each of the connection lines $j_c$ and $j_d$ branches into four lines extending toward the second end side, and the four branch lines pass through four switches of the switch unit SH1, four of the signal lines 13, and four switches of the switch unit SH2, and converge into one line at the second end side to be coupled to a divided electrode in the region (j). In this manner, the number of the signal lines 13 used for coupling is increased according to the wiring length between the connection lines and the divided electrodes. As a result, the conductivity of the routes for coupling the divided electrodes to the other components can be further increased, and thus, a weaker signal can be transmitted such that the weaker signal can be identified. While the divided electrodes of the third embodiment have been described by exemplifying the forms thereof illustrated in FIGS. 27 and 30 to 32, these forms are merely examples. The form of the divided electrodes is not limited to these examples, but can be modified as appropriate. The form of the divided electrodes exemplified in each of the embodiments can be employed in other embodiments.

As described above, according to the third embodiment, providing the first and second periods enables the more accurate extraction of the components (such as the components UD1 and UD2) representing the level of the force.

Although the above description has exemplified what is called an in-cell display apparatus in which the display device and the touch detection device are integrated together, the display apparatus may be what is called an out-cell display apparatus in which the display device and the touch detection device are independent of each other. In that case, the touch detection device has configurations corresponding to those of the first electrodes Tx and the second electrodes Rx. The display device can be omitted. While the above-described embodiments and the above-described modification exemplify the case where the liquid crystal display apparatus is employed as the display device, other examples of the display device include any flat-panel display apparatus, such as an organic electroluminescent (EL) display apparatus, another light-emitting display apparatus, and an electronic paper display apparatus having, for example, electrophoretic elements. The above-described embodiments and the above-described modification can be applied to devices of unlimited size, ranging from small, medium, to large size.

The first electrodes Tx and the second electrodes Rx are not limited to being rectangular in shape and divided into stripes. For example, the first electrodes Tx, the second electrodes Rx, or both may have comb-tooth shape. The shape of cutting parts (such as the cutting parts Cut) for cutting the first electrodes Tx, the second electrodes Rx, or both into a plurality of pieces may be linear or curved. The first electrodes Tx and the second electrodes Rx are made of ITO, for example. However, specific configurations and forms thereof can be modified as appropriate. The first electrodes Tx and the second electrodes Rx may be made of a metallic conductive material. In this case, the touch detection electrode E3 is provided with a configuration using at least one metal material of, for example, aluminum (Al), copper (Cu), silver (Ag), molybdenum (Mo), or an alloy of these elements. Each of the first electrodes Tx and the second electrodes Rx may be a laminate made of a plurality of layers using one or more of these metal materials. When a metallic conductive material is used for the first electrodes Tx and the second electrodes Rx, it is more preferable to have what is called a metal mesh configuration in which mesh processing is applied, or to apply invisibilization processing, such as plating with a black material. The second electrodes Rx may be omitted.

Other operational advantages accruing from the aspects described in the embodiments and the modification that are obvious from the description herein, or that are appropriately conceivable by those skilled in the art will naturally be understood as accruing from the present invention.

What is claimed is:

1. A detection apparatus comprising:
   a touch detection surface serving as a detection region having two dimensions;
   a plurality of first electrodes extending along a first direction of two directions in the two dimensions and arranged in a second direction of the two directions, each of the first electrodes comprising a plurality of divided electrodes arranged in the first direction,
   a detection unit configured to
      form a plurality of first detection regions each provided by bundling the divided electrodes arranged in the first direction in order to output a first detection signal, and
      form a plurality of second detection regions each provided by bundling the divided electrodes arranged in the second direction in order to output a second detection signal;
   wherein the first detection signal is a touch detection signal, and the second detection signal is a force detection signal; and
   a base electrode is provided opposed to the first electrodes, and
   the detection unit is configured to detect force applied to the detection region based on capacitance between each second detection region and the base electrode.

2. The detection apparatus according to claim 1, wherein the detection unit is configured to form the first detection regions by electrically coupling the divided electrodes arranged in the first direction and form the second detection regions by electrically coupling the divided electrodes arranged in the second direction.

3. The detection apparatus according to claim 1, wherein the detection unit is configured to identify a position of a touch operation in the touch detection surface based on the first detection signal and the second detection signal.

4. The detection apparatus according to claim 1, wherein a touch detection electrode is provided opposed to the first electrodes, and
   the detection unit is configured to detect a touch based on capacitance between each first detection region and the touch detection electrode.

5. The detection apparatus according to claim 1, further comprising
   a backlight between the first electrodes and the base electrode.

6. The detection apparatus according to claim 1, further comprising
   a substrate between the backlight and the first electrodes, wherein a gap is provided between the backlight and the substrate.

7. The detection apparatus according to claim 1, wherein each of the first electrodes is made up of a pair of the divided electrodes,
   each of the divided electrodes is L-shaped, and
   one of the pair of the divided electrodes in each of the first electrodes is placed rotated 180 degrees with respect to the other of the pair of the divided electrodes such that the one divided electrode and the other divided electrode are fitted to each other.

8. The detection apparatus according to claim 1, wherein each of the first electrodes is made up of a pair of the divided electrodes,
   each of the divided electrodes has a form of triangle with at least one oblique side, and
   the at least one oblique side of one of the pair of the divided electrodes in each of the first electrodes is opposed to the at least one oblique side of the other of the pair of the divided electrodes.

9. The detection apparatus according to claim 1, further comprising:
   a plurality of pixel electrodes opposed to the first electrodes;

a display function layer opposed to the pixel electrodes; and a display driver configured to supply a common potential to each of the first electrodes and supply a pixel potential to each of the pixel electrodes.

\* \* \* \* \*